United States Patent [19]
Moriya

[11] Patent Number: 5,640,316
[45] Date of Patent: Jun. 17, 1997

[54] PULSE WIDTH MODULATION SIGNAL GENERATING APPARATUS

[75] Inventor: Masaaki Moriya, Zama, Japan

[73] Assignee: Canon Kabushiki Kaisha, Japan

[21] Appl. No.: 612,423

[22] Filed: Mar. 7, 1996

[30] Foreign Application Priority Data

Mar. 8, 1995 [JP] Japan ................... 7-077449

[51] Int. Cl.$^6$ .................................................. H02M 1/12
[52] U.S. Cl. ........................................................ 363/41
[58] Field of Search ...................................... 363/41, 98

[56] References Cited

U.S. PATENT DOCUMENTS

| | | | |
|---|---|---|---|
| 4,439,821 | 3/1984 | Grippe | 363/97 |
| 4,646,217 | 2/1987 | Baroni et al. | 363/41 |
| 5,008,675 | 4/1991 | Toyomaki | 341/152 |
| 5,177,373 | 1/1993 | Nakamura | 327/176 |
| 5,453,921 | 9/1995 | Shutts | 363/41 |
| 5,550,697 | 8/1996 | Green et al. | 363/41 |

*Primary Examiner*—Stuart N. Hecker
*Attorney, Agent, or Firm*—Fitzpatrick, Cella, Harper & Scinto

[57] ABSTRACT

A signal generating apparatus for generating a first pulse width modulation (PWM) signal and a second PWM signal synchronous with the first PWM signal, the first and second PWM signals controlling a switching power supply having a transformer with a plurality of secondary windings. The on-widths of the first and second PWM signals are adapted to be controlled independently, and the on-width of the second PWM signal is adapted to be increased or decreased without being affected by an increasing/decreasing state of the on-width of the first PWM signal. To this end, when the on-width of the second PWM signal is increased or decreased, the data used for increasing or decreasing the second PWM signal is corrected in accordance with the change state of the on-width of the first PWM signal.

7 Claims, 34 Drawing Sheets

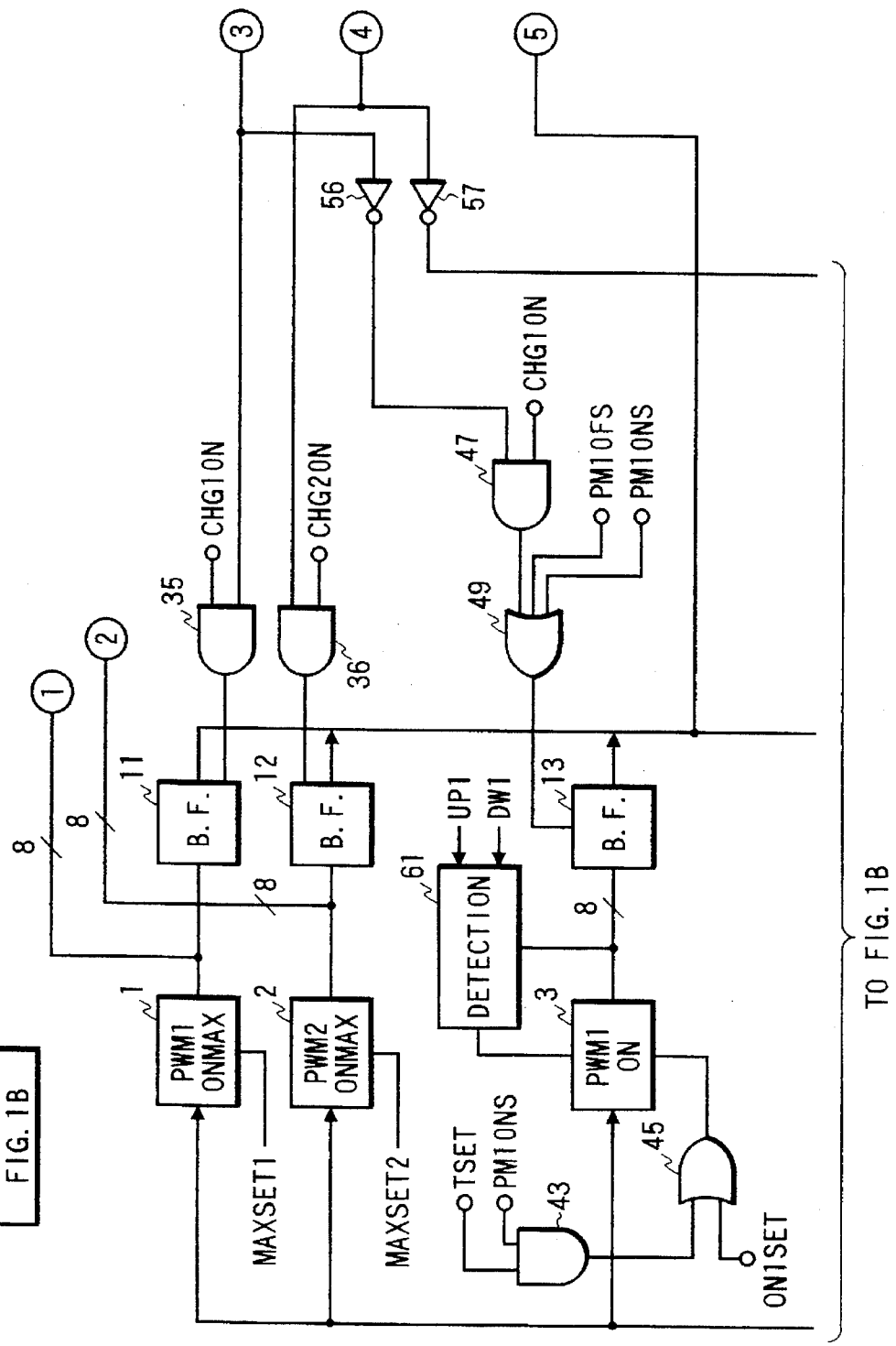

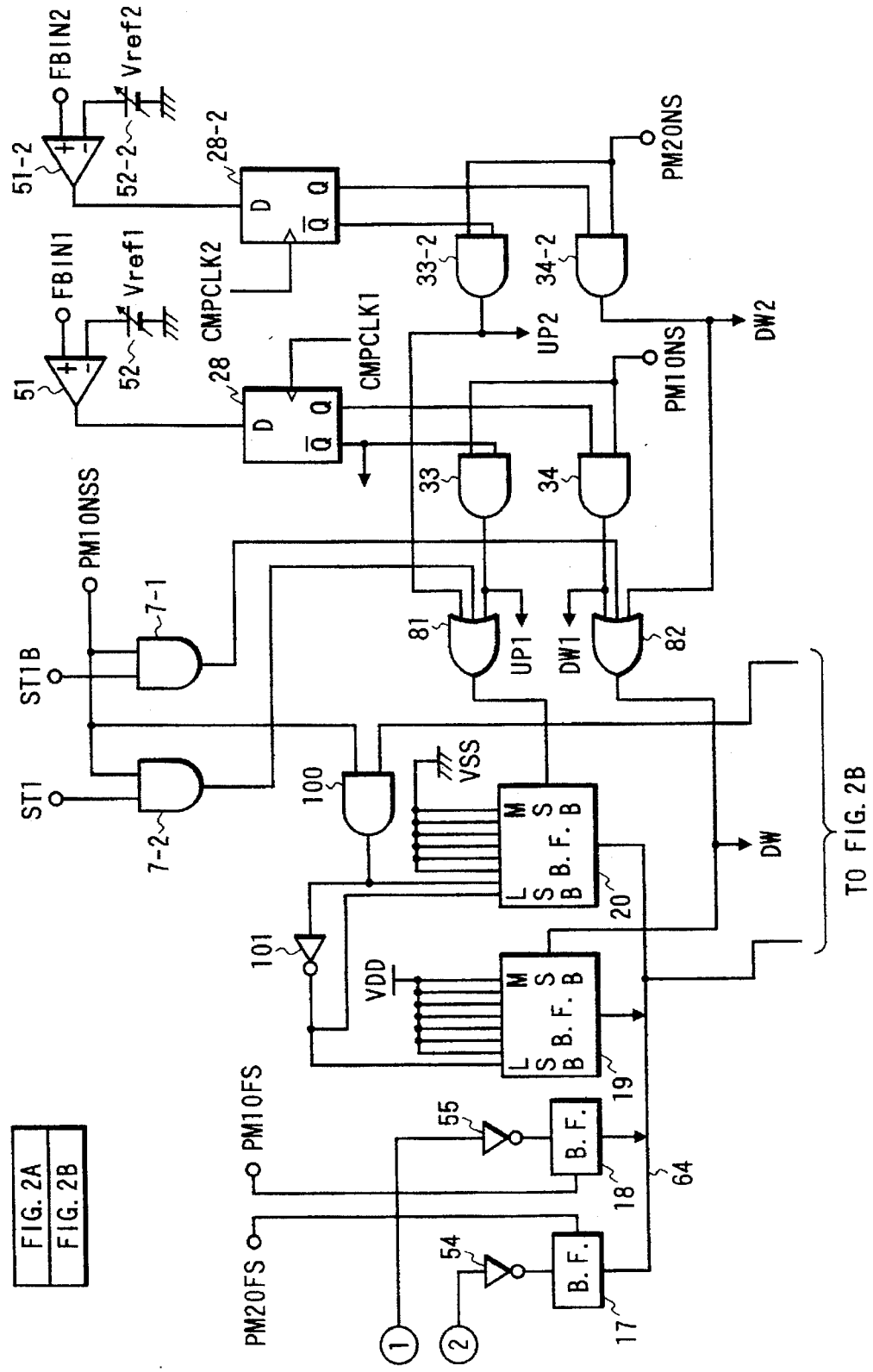

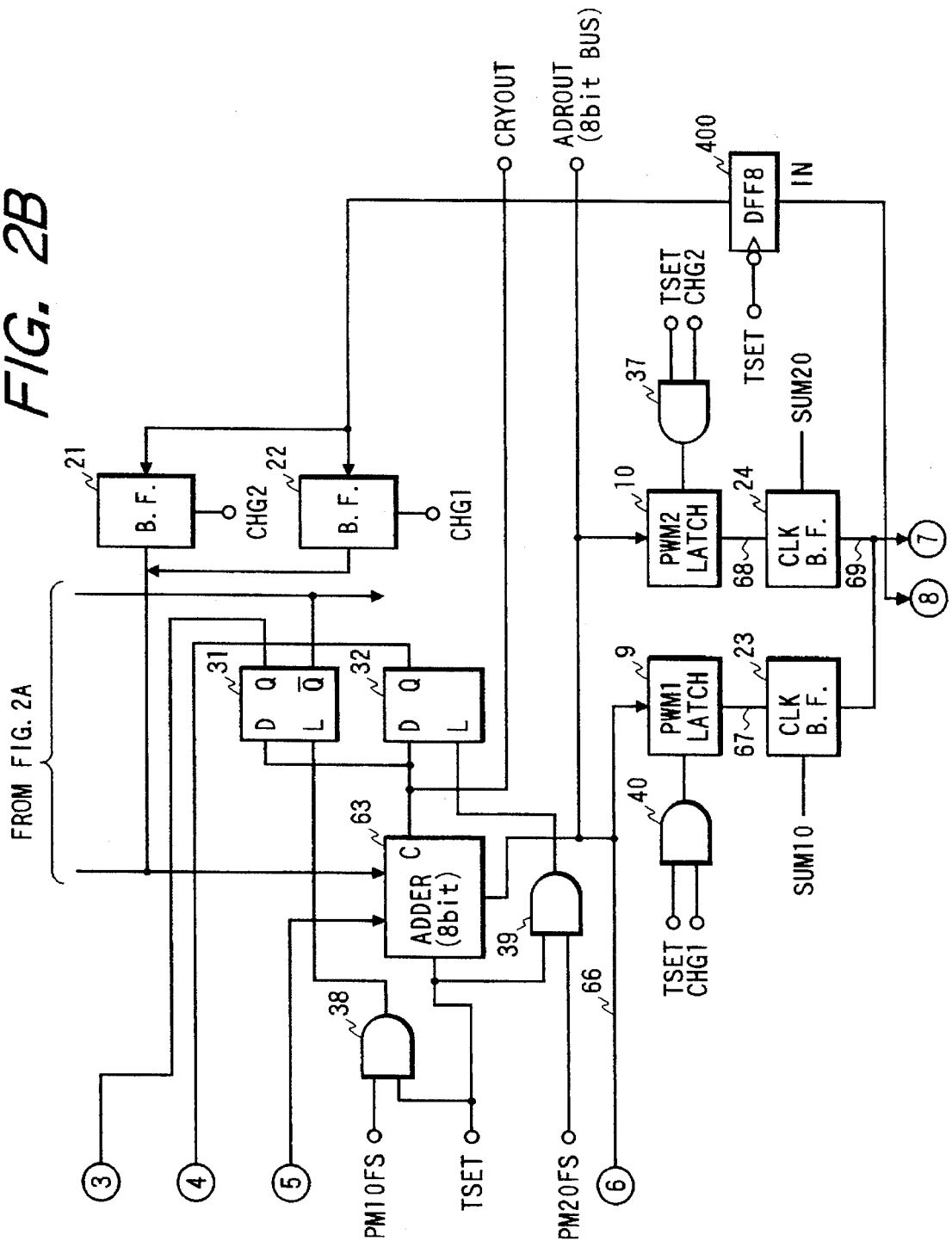

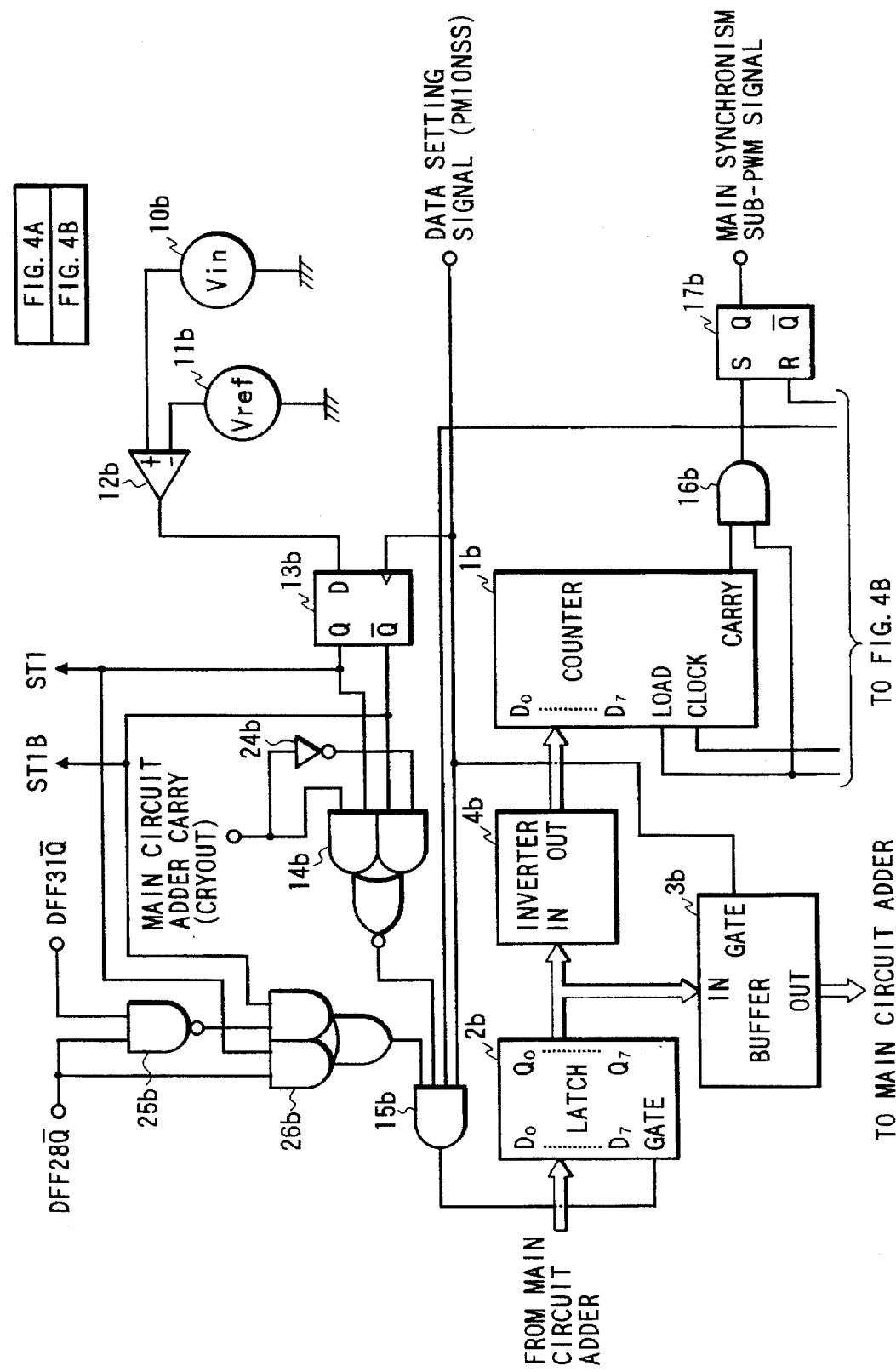

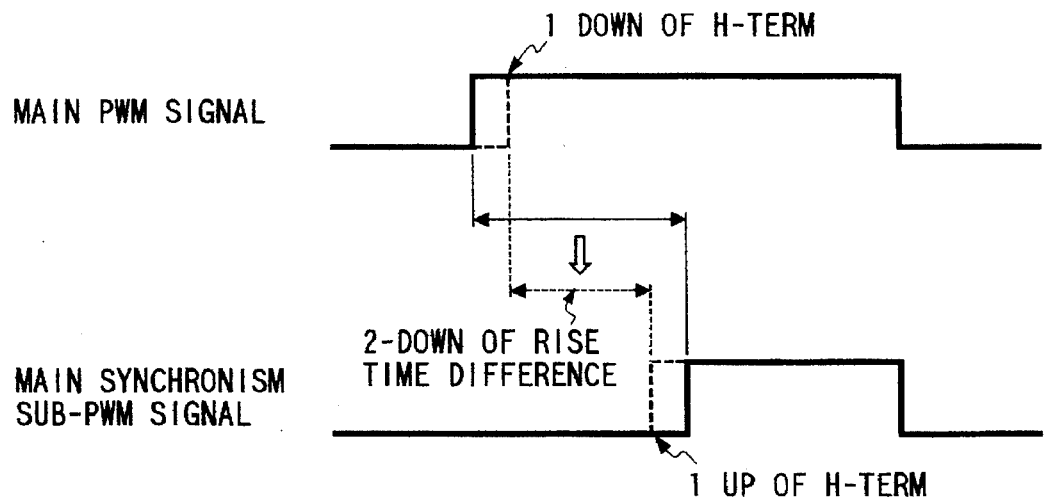
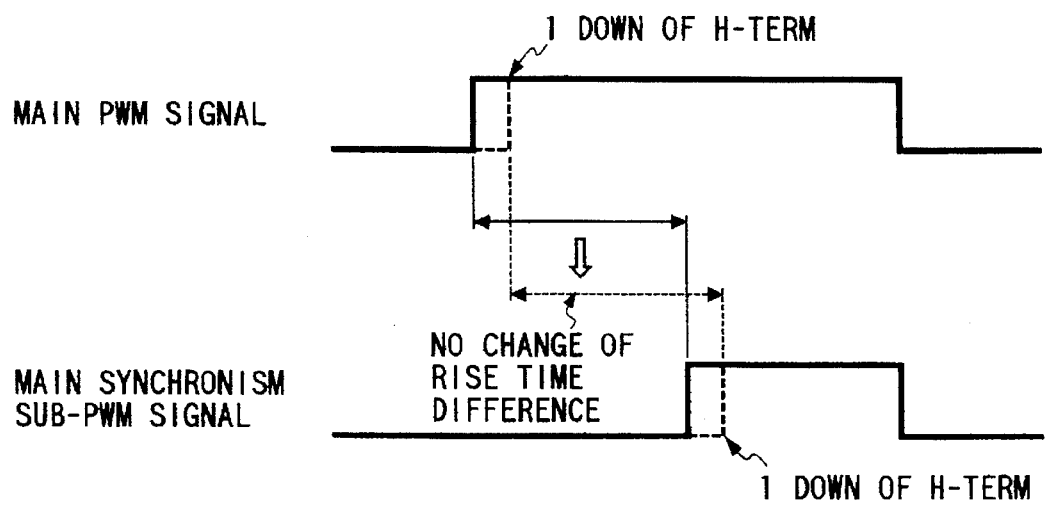

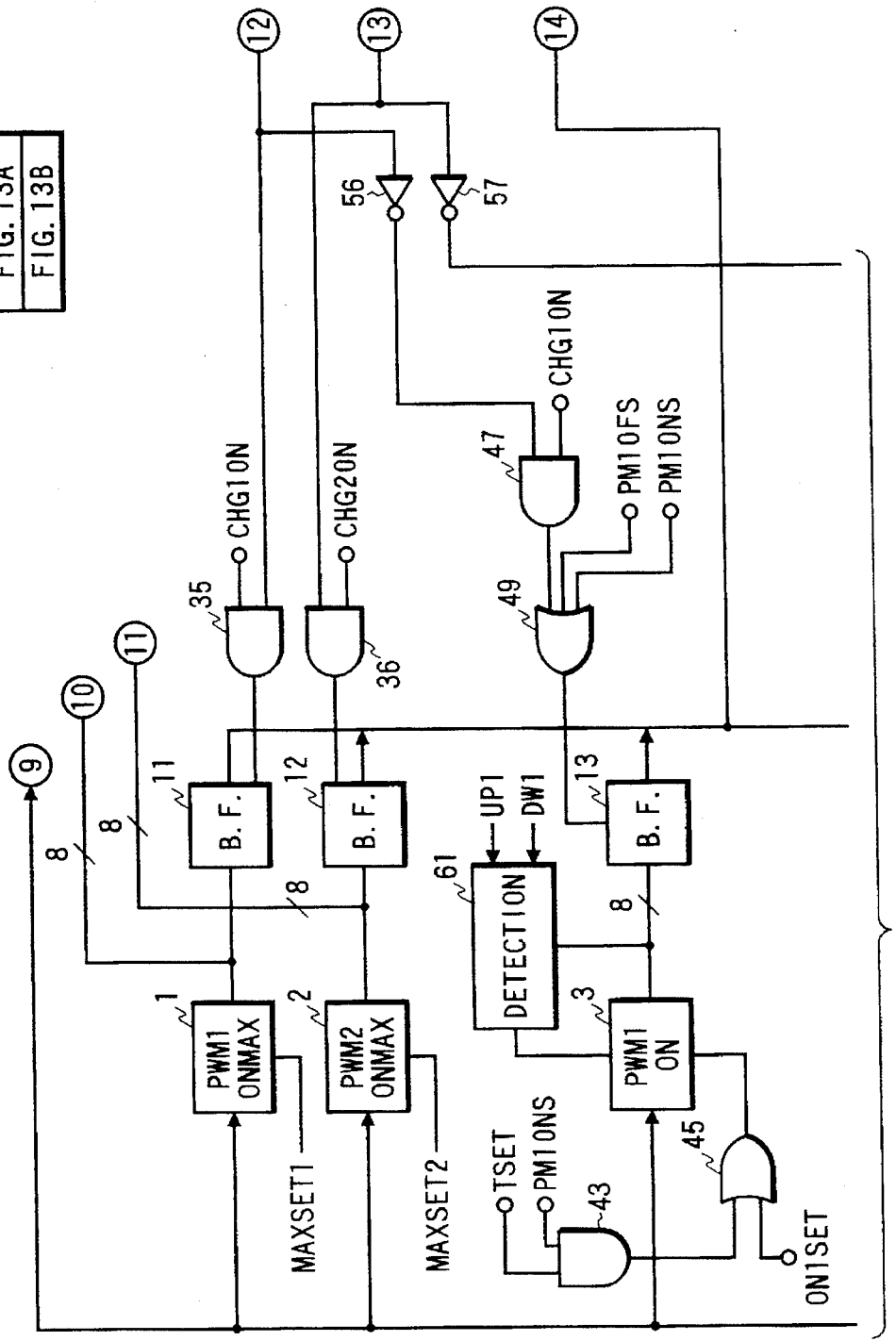

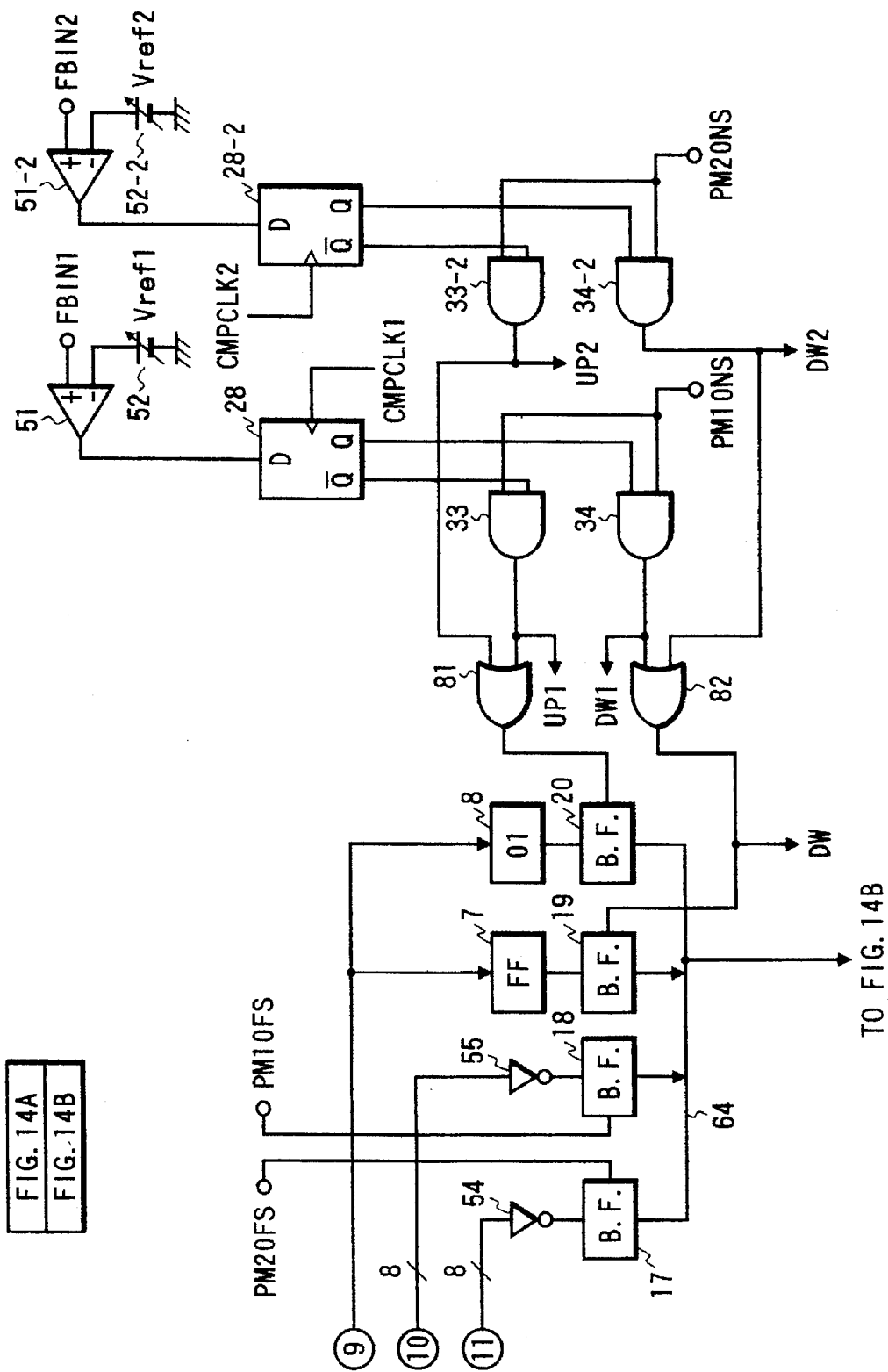

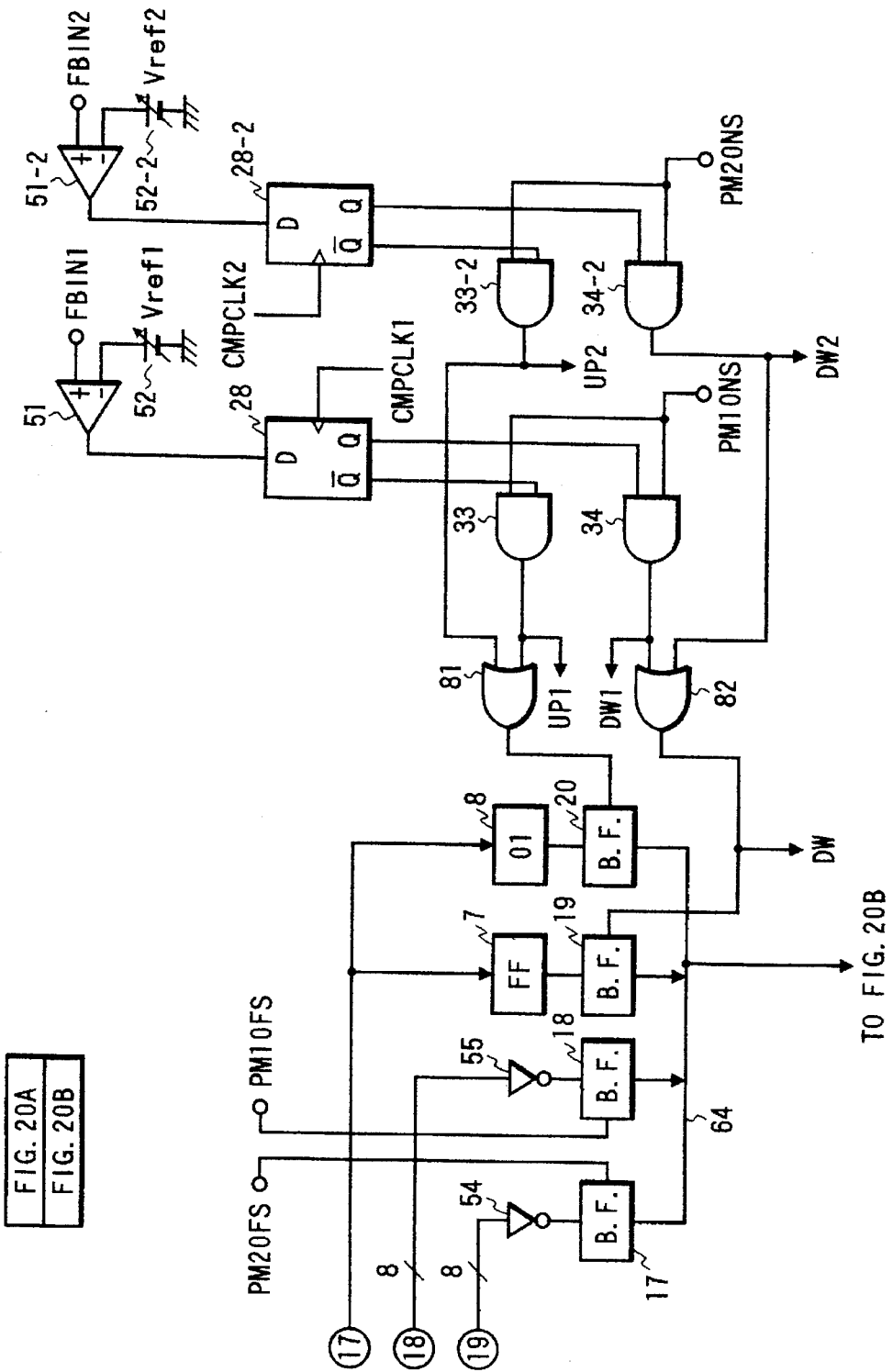

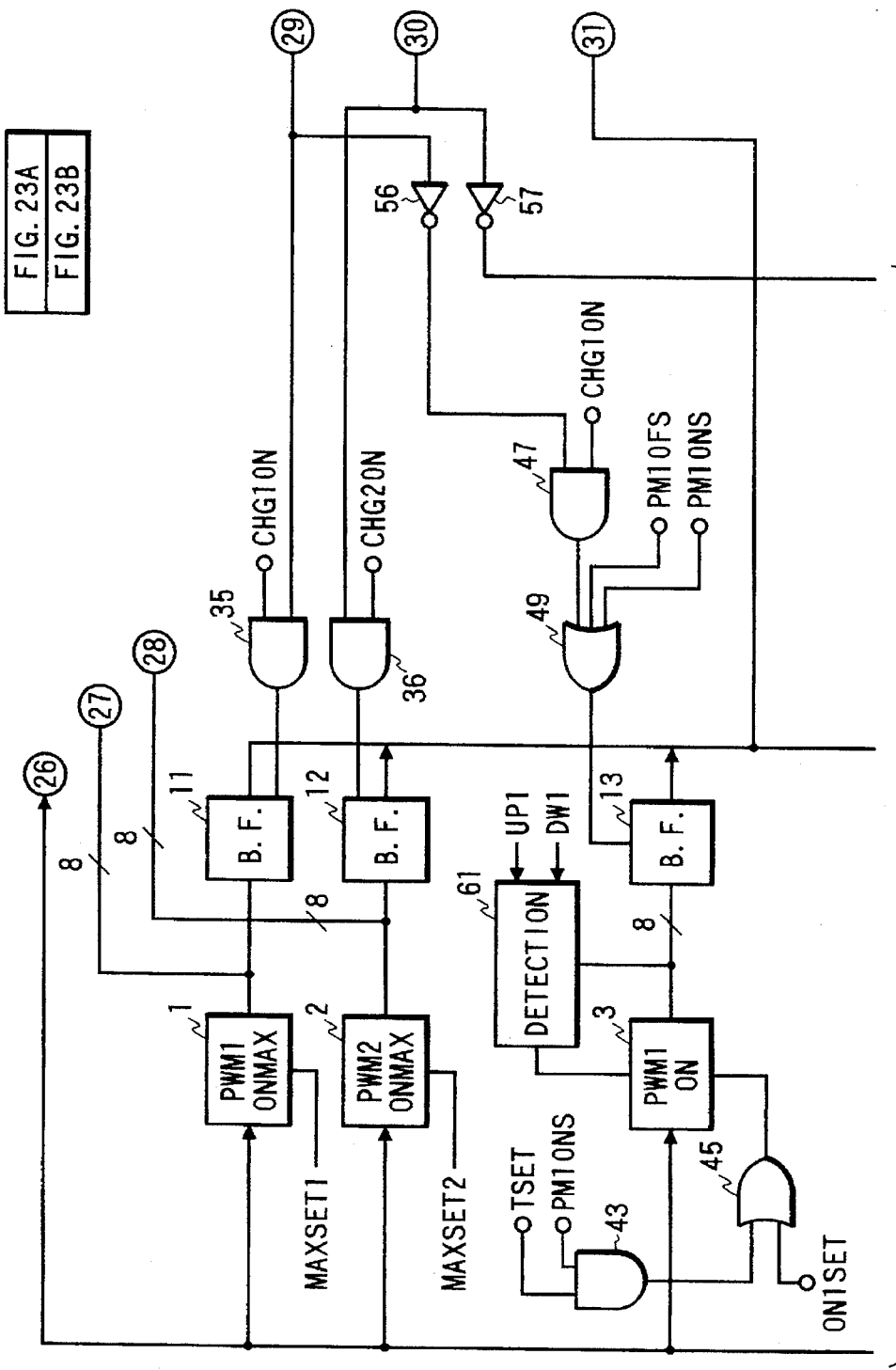

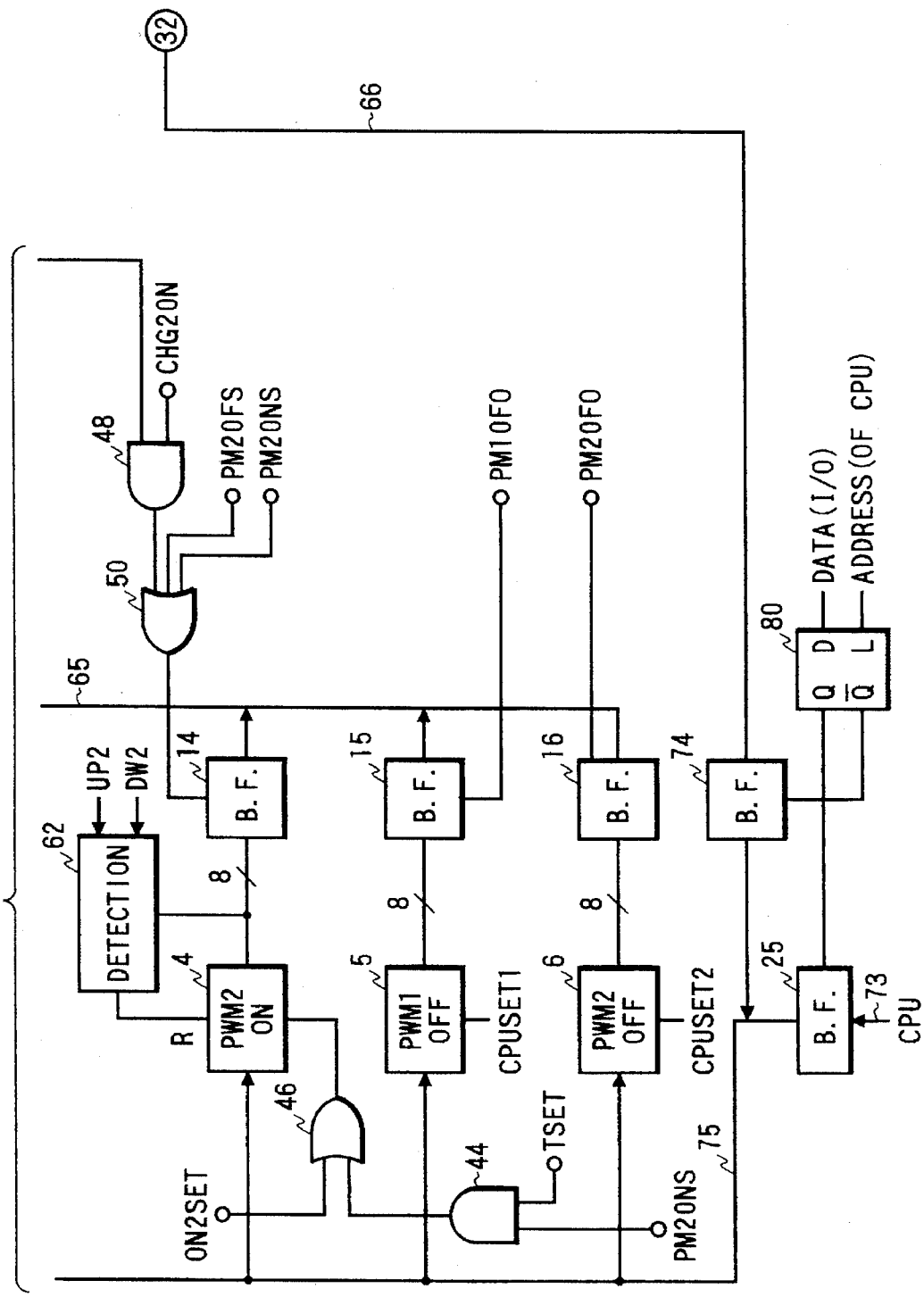

| FIG. 24A |
|---|
| FIG. 24B |

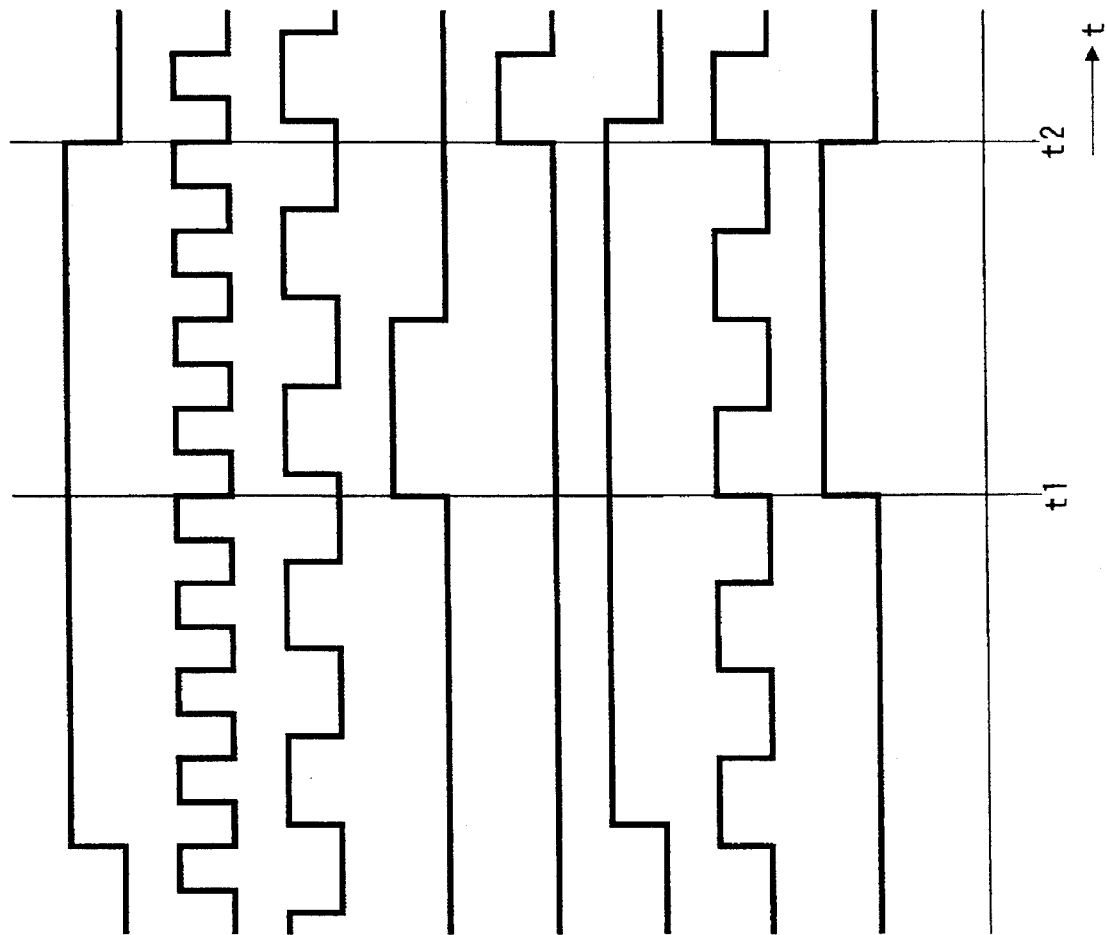

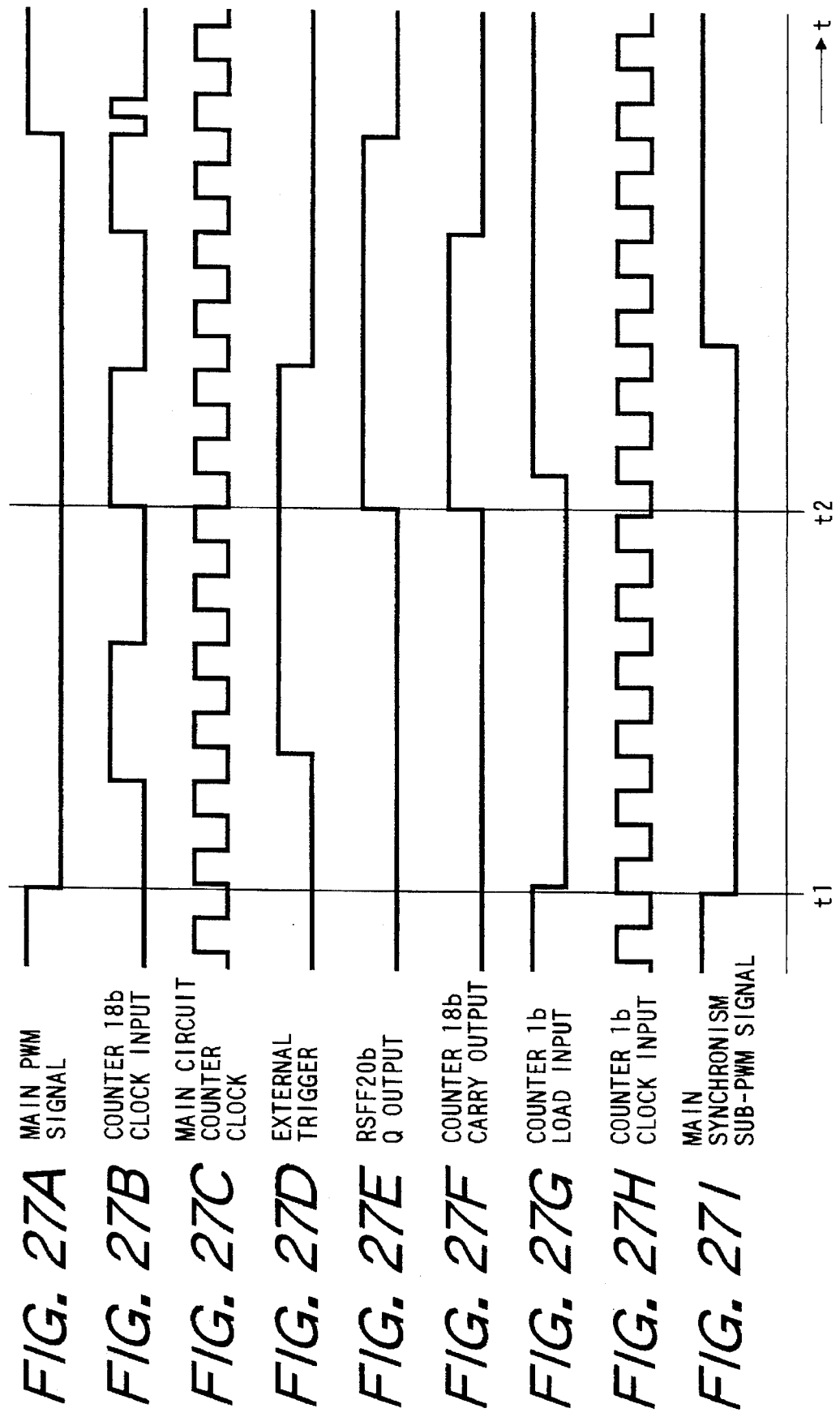

5,640,316

1

PULSE WIDTH MODULATION SIGNAL GENERATING APPARATUS

BACKGROUND OF THE INVENTION

1. Field of the Invention

The present invention relates to a pulse width modulation signal generating apparatus for controlling a power supply of a copier or the like.

2. Related Background Art

A pulse width modulation (PWM) signal generator has been proposed which in order to generate stable low and high voltage outputs from a switching power supply having a single transformer, generates a main PWM signal (hereinafter called a "first PWM signal") for low voltage outputs and a main synchronism sub PWM signal (hereinafter called a "second PWM signal") for high voltage outputs, the second PWM signal synchronizing with the first PWM signal.

FIGS. 13A, 13B, 14 and 15 are block diagrams of a PWM signal generator according to a first related art. In these Figures, reference numeral 1 to 6 represent an 8-bit latch (register) whose output terminals are connected via clocked buffers (B.F.) 11 to 16 to a bus 65. The outputs of the latches 1 and 2 are inverted by inverters 55 and 54 (FIGS. 2A and 2B) and supplied to a bus 64. The output terminals of latches 7 and 8 are connected via clocked buffers (B.F.) 19 and 20 to the bus 64. The input terminals of the latches 1 to 8 are connected to a bus 75. The bus lines 64 and 65 are connected to different input terminals of an adder 63 whose output terminal is connected via a bus 66 to the input terminals of latches 9 and 10, and via the bus 66 and a clocked buffer (B.F.) 74 to a bus 75. The bus 75 is connected via a clocked buffer (B.F.) 25 to a CPU bus 73. The output terminals of the latches 9 and 10 are connected via respective buses 67 and 68 and clocked buffers (CLK B.F.) 23 and 24 to a bus 69, and via clocked buffers 22 and 21 to the bus 64. Reference numeral 26 represents an UP free-run counter (FIG. 3) whose count output terminal is connected via a bus 70 to one input terminal of a digital comparator 27. The other input terminal of the digital comparator 27 is connected to the bus 69. Reference numerals 29 and 30 represent a synchronism T-type flip-flop (hereinafter designated as "TFF") operating in a toggle manner. The Q output terminals of TFFs 29 and 30 are connected to respective output terminals PWM1·OUT and PWM2·OUT, the clock input terminals thereof are connected to a signal line $\overline{\text{TSET}}$, and the data input terminals thereof are connected to the output terminals of respective two-input AND gates 41 and 42. Of the input terminals of the two-input AND gates 41 and 42, one input terminals are both connected to the output terminal of the digital comparator 27, and the other input terminals are connected to signal lines SUM1O and SUM2O. Reference numerals 31 and 32 represent a D-latch whose data input terminals D are connected to the carry output terminal of the adder 63 and whose latch signal input terminals are connected to the output terminals of respective two-input AND gates 38 and 39. One input terminals of the two-input AND gates 38 and 39 are connected to a signal line $\overline{\text{TSET}}$ connected to the clock input terminal of the adder 63 and the other input terminals are connected to respective signal lines PM1OFS and PM2OFS. The Q output terminals of the D-latches 31 and 32 are connected to the one input terminals of two-input AND gates 35 and 36 and to the input terminals of inverters 56 and 67. Reference numeral 51 (FIG. 2A) represents an analog comparator whose minus input terminal is connected to the output terminal of a reference power source 52 with

2 one end being grounded and whose plus input terminal is supplied with a signal FBIN1 of a control information detector of an external control circuit. The output terminal of the analog comparator 51 is connected to the data input terminal of a D-type flip-flop (hereinafter called a "DFF") 28. The $\overline{\text{Q}}$ output terminal of DFF 28 is connected to one input terminal of a two-input gate 33, and the Q output terminal thereof is connected to one input terminal of a two-input gate 34. The other input terminals of the two-input gates 33 and 34 are both connected to a signal line PM1ONS, and the output terminals thereof are connected one input terminals of two-input OR gates 81 and 82 and to signal input terminals UP1 and DW1 of a 1H detector circuit (FIGS. 1A and 1B) 61. Reference numeral 51-2 represents another analog comparator whose minus input terminal, like the analog comparator 51, is connected to the output terminal of another reference power source 52-2 with one end being grounded and whose plus input terminal is supplied with a signal FBIN2 of the control information detector of the external control circuit. The output terminal of the analog comparator 52 is connected to the data input terminal of another DFF 28-2. The $\overline{\text{Q}}$ output terminal of DFF 28-2 is connected to one input terminal of a two-input gate 33-2, and the $\overline{\text{Q}}$ output terminal thereof is connected to one input terminal of a two-input AND gate 34-2. The other input terminals of the two-input AND gates 33-2 and 34-2 are both connected to a signal line PM2ONS. The output terminals of the two-input AND gates 33-2 and 34-2 are connected to the other input terminals of respective two-input OR gates 81 and 82 and to UP2 and DW2 signal input terminals of the 1H detector circuit 62. The output terminals of the two-input OR gates 81 and 82 are connected respective signal control terminals of the clocked buffers 20 and 19. The other input terminals of the two-input AND gates 35 and 36 are connected to signal lines CHG1ON and CHG2ON and the output terminals thereof are connected to the control terminals of the clocked buffers 11 and 12. The control signal input terminals of the latches 9 and 10 for PWM1 and PWM2 signals are connected to the output terminals of respective two-input AND gates 40 and 37. One input terminals of the two-input AND gates 40 and 37 are both connected to the signal line TSET, and the other input terminals are connected to the signal lines CHG1 and CHG2. Reference numerals 47 and 48 represent a two-input AND gate whose one input terminals are connected to respective signal lines CHG1ON and CHG2ON and whose other input terminals are connected to the output terminals of inverters 56 and 57. Reference numerals 49 and 50 represent a three-input OR gate whose one input terminals are connected to the output terminals of the two-input AND gates 47 and 48. The other two input terminals of the three-input OR gate 49 are connected to signal lines PM1OFS and PM1ONS and the other two input terminals of the three-input OR gate 50 are connected to signal lines PM2OFS and PM2ONS. The output terminals of the three-input OR gates 49 and 50 are connected to the control terminals of the clocked buffers 13 and 14. One input terminals of two-input AND gates 43 and 44 are both connected to the signal line TSET and the other input terminals thereof are connected to the signal lines PM1ONS and PM2ONS. The output terminals of the two-input AND gates 43 and 44 are connected to one input terminals of respective two-input OR gates 45 and 46 whose other input terminals are connected to respective signal lines ON1SET and ON2SET. The output terminals of the two-input OR gates 45 and 46 are connected to the latch input terminals of the latches 3 and 4. The latch control terminals of the latches 1, 2, 5, and 6 are connected to respective signal lines MAXSET1, MAXSET2, CPUSET1, and CPUSET2. The control terminals of the clocked buffers 15, 16, 17, 18, 21, 22, 23, and 24 are connected to respective signal lines PM1OFO, PM2OFO, PM2OFS, PM1OFS, CHG2, CHG1, SUM1O and SUM 2O. The control terminals of the clocked buffers 25 and 74 are connected to respective Q and $\overline{Q}$ output terminals of a D-latch 80 which serves as a flag of CPU. The latch input terminal of the D-latch 80 is supplied with an address signal and the data input terminal is connected to a signal line through which CPU supplies flag set data. Reference numeral 53 represents a timing circuit (FIG. 3) for generating various signals to be supplied to the above-described signal lines, the timing circuit 53 having an inverter 58, a ½ frequency divider 59, and a delay circuit 60. Reference numeral 83 represents a basic clock input terminal which is connected to the input terminal of the ½ frequency divider 59 and to the input terminal of the delay circuit 60. The output terminal of the delay circuit 60 is connected to the signal line $\overline{TSET}$ and to the input terminal of the inverter 58. The output terminal of the ½ frequency divider 59 is connected to the clock input terminal of the free-run counter 26. The output terminal of the inverter 58 is connected to the signal line $\overline{TSET}$. The timing circuit 53 also has input terminals for the $\overline{Q}$ output signals from the DFFs 29 and 30. It is assumed that the delay circuit 60 can provide a delay time corresponding to a half period of a period from 0 to φ. Reference numerals 61 and 62 represent a 1H detector circuit (FIGS. 1A and 1B) for detecting a 1H digital value whose input terminals are connected to the output buses of the latches 3 and 4. The output signals of the DFFs 28 and 28-2 described above are supplied to the control signal input terminals of the 1H detector circuits 61 and 62. The output signal lines of the 1H detector circuits are connected to the reset input terminals of the latches 3 and 4. The detailed structure of the inverters 54 and 55 is shown in FIG. 16.

Next, the operation of the PWM signal generator of the first related art will be described with reference to FIGS. 17 and 18.

FIG. 17 is a basic timing chart of the first related art. Although not shown in the block diagrams of FIGS. 13A, 13B, 14A and 14B and 15, all the latches, flip-flops, and counters are reset to 0H (0 of hexadecimal) when the operation starts.

The UP free-run counter 26 counts up by 1 starting from 0 and when the count reaches FFH it is reset to 0 (Steps S1 and S3). The fundamental operation of generating a PWM signal is as follows. In the case of the first pulse (PWM signal at the output terminal PWM1·OUT), each time the data of the PWM1 latch 9 coincides with the value of the UP free-run counter 26 the adder 63 adds alternately the on-data representative of the on-period of the PWM signal or the off-data representative of the off-period of the PWM signal to the value of the UP free-run counter 26, the addition result is again set to the latch 9 (Steps S2 and S4), and the value of the on-data added with or subtracted by "1" (Step S5) is compared with a MAX limiter value (Steps S6 and S7). The above Steps are repeated. The on- and off-data to be added to the counter value are in the latches 3 and 5. At the timings of CHG1ON and PWM1OFO, the clocked buffers 13 and 15 are made through so that the on- or off-data is added to the value of the latch 9 and the result is again set to the latch 9.

A simplified flow chart of the processes regarding the PWM1 signal is shown in FIG. 18.

In the case of the second pulse (PWM signal at the output terminal PWM2·OUT), like in the case of the first pulse, each time the data of the PWM2 latch 10 coincides with the value of the UP free-run counter 26, the adder 63 adds alternately the on-data representative of the on-period of the PWM signal or the off-data representative of the off-period of the PWM signal to the value of the UP free-run counter 26, the addition result is again set to the latch 10, and the value of the on-data added with or subtracted by "1" is compared with the MAX limiter value. The above operations are repeated. The on- and off-data to be added to the counter value are in the latches 4 and 6. At the timings of CHG2ON and PWM2OFO, the clocked buffers 14 and 16 are made through so that the on- or off-data is added by the adder 63 to the value of the latch 10 and the result is again set to the latch 10.

The circuit for the second pulse is designed so that at the same timing when the data of the latch 9 coincides with the data of the counter 26, the adder 63 adds the data of the latch 10 to the data of the latch 4 or 6 and the addition result is again set to the latch 10. Similarly, the circuit for the first pulse is designed so that at the same timing when the data of the latch 10 coincides with the data of the counter 26, the adder 63 adds the data of the latch 9 to the data of the latch 3 or 5 and the addition result is again set to the latch 9. This addition operation is always performed always only at the timing immediately after the inversion of the output value at the output terminal PWM1·OUT or PWM2·OUT or at the timing when a comparator coincidence signal is not generated, i.e., at timings of CHG1ON, CHG2ON, PM1OFO, and PWM2OFO shown in FIG. 17.

For the above control, it is necessary to properly switch the data of the clocked buffers 13, 14, 15, 16, 21, 22, 23, and 24. Control signals used for this purpose are shown in the timing chart of FIG. 17. Specifically, the control signals include CHG1ON, CHG2ON, PW1OFO, PW20FO, CHG2, CHG1, SUM1O, and SUM2O. The adder 63 operates to set the addition result to its output terminal at each rise timing of the $\overline{TSET}$ signal, and operates to output the addition result to the bus line 66. In other words, the adder 63 is made of one module of a usual adder and a D-type flip-flop. The latch 9 is supplied with a control signal from the two-input AND gate 40 which control signal is a logical product of the signals $\overline{TSET}$ and CHG1, whereas the latch 10 is supplied with a control signal from the two-input AND gate 37 which control signal is a logical product of the signals $\overline{TSET}$ and CHG2. The clocked buffers 23 and 24 are supplied with the control signals SUM1O and SUM2O, respectively, to allow the above complicated control to be operable in a time division manner.

CHG1 and CHG2 are generated at the timing of 31.25 ns immediately after the signals PWM1 and PWM2 are inverted. CHG1 is a logical sum of CHG1ON and PM1OFO, whereas CHG2 is a logical sum of CHG2ON and PM2OFO.

A comparison result of the digital comparator 27 is outputted to the signal line 71. The output signals of the two-input AND gates 41 and 42 are supplied to the T input terminals of the T-type flip-flops 29 and 30 at the timing of the signal $\overline{TSET}$. The signals are inverted by the flip-flops 29 and 30 to output correct PWM signals from the output terminals PWM1·OUT and PWM2·OUT.

Although all the latches, counters, comparators, and adders shown in FIGS. 13A, 13B, 14A, 14B and 15 are assumed to be an 8-bit configuration for the convenience of description, the bit size may be set as desired. The timing chart shown in FIG. 17 is assumed that 3H data is set to the PWM1 latch 3 and PWM2 latch 4.

The initial values of respective circuit portions are set as in the following. An unrepresented CPU for controlling the power supply turns the flag 80 on to make the clocked buffer be through and the clocked buffer 74 be in a high impedance state. Thereafter, CPU applies data setting signals each constituted by an address signal and a strobe signal to the signal lines MAXSET1, MAXSET2, ON1SET, ON2SET, CPUSET1, and CPUSET2, and sets desired data to the latches 1 to 6 via the buses 73 and 75. Thereafter, CPU sets "0" to the flag 80 to make the clocked buffer 74 be through and the clocked buffer be in a high impedance state.

Next, the control of an on-width of the PWM signal will be described. This control is performed by using the adder 63 at the timings of PM1ONS and PM2ONS while the digital comparator 27 does not output a coincidence signal, i.e., during the off (O) period of the PWM signal.

With the on-width feedback control of the PWM1 signal, the on-width of the PWM1 signal is made narrower to make the value of FBIN1 smaller if Vref <FBIN1 where Vref1 represents a comparison reference voltage of the analog comparator 51 and FBIN1 represents an external feedback signal, and if Vref1 >FBIN1 the on-width of the PWM1 signal is made wider to make the value of FBIN1 larger.

The output value of the analog comparator 51 is sampled by the D-type flip-flop (DFF) 28 synchronously with CMP·CLK1 (replaceable by PM1OFS). If the output value is H, the Q output of DFF 28 is H, whereas if the output value is L, the Q output is L. When the Q output of DFF 28 is H, the clocked buffer 19 is selected and made through and the clocked buffer 20 is made in a high impedance state, by the gates 33, 34, 81, and 82 at the timing when the signal PM1ONS becomes H. Conversely, when the Q output of DFF 28 is L, the clocked buffer 20 is selected and made through and the clocked buffer 19 is made in a high impedance state, by the gates 33, 34, 81, and 82 at the timing when the signal PM1ONS becomes H. Specifically, in order to widen the on-width, the adder 63 adds O1H data in the latch 8 to the value of the latch 3, and the addition result is again written in the latch 3 to increment the value of the latch 3 by 1. In order to narrow the on-width, the adder 63 adds FFH data in the latch 7 to the value of the latch 3, and the addition result is again written in the latch 3 to decrement the value of the latch 3 by 1.

Similarly, with the on-width feedback control of the PWM2 signal, the on-width of the PWM2 signal is made narrower to make the value of FBIN2 smaller if Vref2<FBIN2 where Vref2 represents a comparison reference voltage of the analog comparator 51-2 and FBIN2 represents an external feedback signal, and if Vref2>FBIN2 the on-width of the PWM2 signal is made wider to make the value of FBIN2 larger.

The output value of the analog comparator 51-2 is sampled by DFF 28-2 synchronously with CMP·CLK2 (replaceable by PM2OFS). If the output value is H, the Q output of DFF 28-2 is H, whereas if the output value is L, the Q output is L.

When the Q output of DFF 28-2 is H, the clocked buffer 19 is selected and made through and the clocked buffer 20 is made in a high impedance state, by the gates 33, 34, 81, and 82 at the timing when the signal PM2ONS becomes H. Conversely, when the Q output of DFF 28 is L, the clocked buffer 20 is selected and made through and the clocked buffer 19 is made in a high impedance state, by the gates 33, 34, 81, and 82 at the timing when the signal PM2ONS becomes H. Specifically, in order to widen the on-width of the PWM signal, the adder 63 adds O1H data in the latch 8 to the value of the latch 4, and the addition result is again written in the latch 4 to increment the value of the latch 4 by 1. In order to narrow the on-width, the adder 63 adds FFH data in the latch 7 to the value of the latch 4, and the addition result is again written in the latch 4 to decrement the value of the latch 4 by 1.

For the above controls, PM1ONS and TSET signals are supplied via the two-input AND gate 43 and OR gate 45 to the latch 3 which stores the control data of the on-width of the PWM1 signal, and PM1ONS signal is supplied via the OR gate 49 to be buffer 13. Similarly, PM2ONS and TSET signals are supplied via the two-input AND gate 44 and OR gate 46 to the latch 4 which stores the control data of the on-width of the PWM2 signal, and PM2ONS signal is supplied via the OR gate 50 to be buffer 14. CMP·CLK1 sampling signal may be another signal if it synchronizes with PM1ONS, and CMP·CLK2 sampling signal may be another signal if it synchronizes with PM2ONS.

By changing the values of the latches 8 and 7, the on-width to be made wider or narrower can be set as desired.

Next, the control of a pulse maximum value (maximum on-width) limiter will be described. This control also uses the PWM signal off (O) period, more in particular, uses the adder 63 at the timings of PM1OFS and PM2OFS.

In the case of the PWM1 signal, the inverted values of the value of the latch 3 and the value (maximum pulse width value of the PWM1 signal) of the latch 1 are added together by the adder 63. If the addition result generates a carry, "1" is set to the D-latch 31, and if not, "0" is set to the D-latch 31. The latch timing is a timing when PWM1OFS and TSET signals are supplied via the AND gate 38 to the D-latch 31. If the Q output of the D-latch 31 becomes "1" once, the two-input AND gate 47 turns off and the two-input AND gate 35 turns on so that when the next CHG1ON signal is inputted, the value of the latch 1 is outputted to the bus 65 instead of the value of the latch 3. Therefore, the on-width of the PWM1 signal is always controlled to be set to the maximum value of the on-width set in the latch 1.

Specifically, with this control, if the addition result of the on-width and the inverted value of the maximum width data of the latch 1 becomes larger than the maximum width data of the latch 1, a carry is generated and this information is latched to control the maximum on-width.

If the Q output of the D-latch 31 is "0", one input of the two-input AND gate 47 becomes H and the output of the two-input AND gate 35 becomes L. Therefore, when the next CHG1ON signal is inputted, the value of the latch 3 itself is outputted to the bus 65.

For the bus control, the latches 17 and 18 and clocked buffers 11, 12, 13, and 14 are controlled synchronously with PM2OFS, PM1OFS, CHG1ON, CHG2ON, CHG1ON, and CHG2ON. The inverters 54 and 55 invert all the bits of the latches 2 and 1 and output them to the bus 64 via the clocked buffers 17 and 18. The detail of the inverters 54 and 55 is shown in FIG. 16. The minimum on-width can also be controlled easily in the manner similar to the above.

The minimum on-width detector circuits 61 and 62 detect the minimum on-widths of PWM1 and PWM2 signals. In this example, these circuits detect 1H which is the minimum on-width and control to set the on-width so as not to make it equal to or narrower than the minimum on-width. The circuits 61 and 62 detect the values 1H of the latches 3 and 4, and operate to always set the value of the latches 3 and 4 to 1H when DW1 and DW2 are "1" and UP1 and UP2 are "0", and to release 1H of the latches 3 and 4 when DW1 and DW2 change from "1" to "0" and UP1 and UP2 change from "0" to "1".

In the case of the PWM2 signal, the value of the latch 4 and the value (maximum pulse width value of the PWM2 signal) of the latch 2 are added together by the adder 63. If the addition result generates a carry, "1" is set to the D-latch 32, and if not, "0" is set to the D-latch 32. The latch timing is a timing when PWM2OFS and TSET signals are supplied via the AND gate 39 to the D-latch 32. If the Q output of the D-latch 32 becomes "1" once, the two-input AND gate 48 turns off and the two-input AND gate 36 turns on so that when the next CHG2ON signal is inputted, the value of the latch 2 is outputted to the bus 65 instead of the value of the latch 4. Therefore, the on-width of the PWM2 signal is always controlled to be set to the maximum value of the on-width set in the latch 2.

Specifically, with this control, if the addition result of the on-width and the inverted value of the maximum width data of the latch 2 becomes larger than the maximum width data of the latch 2, a carry is generated and this information is latched to control the maximum on-width.

If the Q output of the D-latch 32 is "0", one input of the two-input AND gate 48 becomes H and the output of the two-input AND gate 36 becomes L. Therefore, when the next CHG2ON signal is inputted, the value of the latch 4 itself is outputted to the bus 65.

The timing circuit 53 generates the above timing signals. A basic clock is applied to a terminal 83, frequency divided by the ½ frequency divider 59, and supplied to the clock input terminal of the UP free-run counter 26. The basic clock is delayed by the delay circuit 60 and outputted as $\overline{TSET}$ signal or inverted by the inverter 58 to be outputted as $\overline{TSET}$ signal. By using these signals and PWM1 and PWM2 signals, the timing circuit 53 can readily generate all other timing signals through digital differentiation.

FIGS. 19A, 19B, 20A, 20B, and 21 are block diagrams of a PWM signal generator according to a second related art. The fundamental structure and operation are similar to the first related art, and so only different points will be described.

As compared to the first related art, the second related art is provided additionally with a DFF 400 (8 bits) and an OR gate 401. TSET signal is inputted to the inverted clock input terminal of DFF 400. The 8-bit data input terminal of DFF 400 is connected to the 8-bit output terminal of the free-run counter 26, and the Q output terminal thereof is connected to the input terminals of the buffers 21 and 22. These circuit portions are different from the buffers 21 and 22 of the first related art. Furthermore, in the first related art, although one input terminal of the AND gate 41 is directly connected to the output terminal of the digital comparator 27, in the second related art, it is connected via one input terminal of the two-input OR gate 401. The other input terminal of the OR gate 401 is connected to the trigger input terminal 402 to which a trigger signal TIM is supplied externally.

The operation of the second related art will be described.

If the external trigger signal TIM is not used, the first related art without DFF 400 may be used. However, the structure of the first related art without DFF 400 is associated with the following problem. Namely, if an H signal for externally controlling the PWM signal is inputted to the trigger input terminal while the digital comparator 27 does not output a coincidence signal, the values to be re-set to the latches 9 and 10 become incorrect and the circuit operates erroneously because the value of the comparator 27 and the value of the counter 26 are not coincident.

To solve this problem, each time the count of the free-run counter 26 changes by "1", the count of the free-run counter 26 is latched to DFF 400 at the fall timing of TSET signal. Therefore, even if the off-period of the PWM signal is changed instantly by applying the trigger signal TIM to the trigger input terminal 402, the adder 63 can add together the value of DFF 400 and the on- or off-data of the PWM signal and can generate the PWM signal without any malfunction. When the digital comparator 27 outputs the coincidence signal, the value of the free-run counter 26 is latched by DFF 400 and the operation similar to the first related art is performed.

FIGS. 22A and 22B are block diagrams of a PWM signal output unit of a third related art, the unit operating synchronously with an output of the PWM signal of the second related art. FIGS. 23A, 23B, 24A, 24B and 25 are block diagrams of a PWM signal generator unit of the third related art corresponding to that of the second related art. In FIGS. 22A and 22B, identical signals to those shown in FIGS. 23A, 23B, 24A, 24B and 25 are given the same signal names in parentheses as FIGS. 23A, 23B, 24A, 24B and 25, and a signal without a name in parentheses is a newly added signal.

The circuit of the third related art is applied, for example to the case where a switching power supply having a single transformer is used for supplying stable low and high voltage outputs. In such a case, a primary side switching element of the switching power supply is turned on and off by a main PWM signal (first PWM signal) to obtain a stable low voltage output from a low voltage secondary winding, and a secondary side switching element connected to a high voltage secondary winding is turned on and off by a main synchronism sub PWM signal (second PWM signal) to obtain a stable high voltage output from the high voltage secondary winding. Since the main synchronism sub PWM signal is synchronous with the main PWM signal, the circuit can be structured so that the secondary switching element can be turned on and off in a no-voltage state and a loss of the secondary switching element can be reduced.

Since the fundamental structure and operation of the third related art is similar to the second related art, generation of the main synchronism sub PWM signal will be described in correspondence with the second related art. The fundamental circuit portion is called a main circuit.

Referring to FIGS. 22A and 22B, reference symbol 1b represents an 8-bit up-counter and reference symbol 2b represents an 8-bit latch. An output of the adder 63 of the main circuit is supplied to the 8-bit D input terminal of the latch 2b, and the output of the latch 2b is supplied via a transfer buffer 3b to the input bus 65 of the adder 63 of the main circuit. Reference symbol 4b represents an 8-bit inverter which inverts the data latched by the latch 2b and supplies it to the data input terminal of the counter 1b. Reference symbol 5b represents an RS-type flip-flop (hereinafter called an "RSFF"), reference symbol 6b represents an OR gate, and reference symbol 7b represents a latch which prevents the data load release of the data input terminal of the counter 1b from having the same timing as the clock rise timing. Reference symbol 8b represents an inverter, and reference symbol 9b represents a DFF for frequency dividing the system clock and supplying it to the counter 1b. Reference symbol 10b represents a controlled power supply voltage Vin, and reference symbol 11b represents a reference voltage Vref to be compared with the controlled power supply voltage Vin. Reference symbol 12b represents a comparator, reference symbol 13b represents a DFF, and reference symbol 14b represents a composite gate for outputting an NOR of the outputs of two two-input AND gates which intercept an input of a clock to the latch 2b while the maximum/minimum on-width limit operation is performed. Reference symbol 15b represents an AND gate for supplying a clock to the latch 2b, and reference symbol 16b represents an AND gate for outputting an AND of the Q output of the latch 7b and a carry output of the counter 1b. Reference symbol 17b represents an RSFF for outputting the main synchronism sub PWM signal, and reference symbol 18b represents a protect counter (hereinafter simply called a "counter") for setting a predetermined protect period (input inhibition period) in response to an input of an external trigger. Reference symbol 19b represents a frequency divider circuit, and reference symbol 20b represents an RSFF. Reference symbol 21b represents a composite gate, reference symbol 22b represents an AND gate, and reference symbols 23b and 24b represent an inverter. It is assumed that the counter 18b has a bit length sufficient for enabling the protection of the whole "L" period of the maim PWM signal in response to a clock period of the frequency divider circuit 19b.

The circuit connection is as in the following.

The S input terminal of RSFF 5b is connected via the AND gate 22b to an external trigger input terminal (MSTRG), the R input terminal thereof is connected to a main PWML period setting signal line (PM1OFO), and the Q output is supplied to one input terminal of the two-input OR gate 6b. The other input terminal of the two-input OR gate 6b is connected to a PMW1OUT signal line, and the output terminal of the OR gate 6b is connected to the D input terminal of the D-latch 7b. The clock input terminal of the D-latch 7b is connected to a main circuit counter clock (SUM2O) signal line, and the Q output terminal thereof is connected to the clock input terminal of the counter 1b and to one input terminal of the two-input AND gate 16b. The other input terminal of the two-input AND gate 16b is connected to a carry signal output terminal of the counter 1b. The output terminal of the two-input AND gate 16b is connected to the S input terminal of RSFF 17b, and the R input terminal of RSFF 17b is connected to the main PWML period setting signal line (PM1OFO). The Q output terminal of RSFF 17b is an output terminal for the main synchronism sub PWM signal. The clock input terminal of the counter 1b is connected to the D input terminal and Q output terminal of DFF 9b. The clock input terminal of DFF 9b is connected to the output terminal of the inverter 8b, and the input terminal of the inverter 8b is supplied with a system clock (TSET). The clock input terminal of the latch 2b is connected to the output terminal of the three-input AND gate 15b. One input terminal of the three-input AND gate 15b is supplied with the system clock (TSET), another input terminal thereof is connected to the output terminal of the composite gate 14b, and the other input terminal thereof is inputted with a data setting signal (PM1ONSS). This data setting signal (PM1ONSS) is also supplied to the input terminal of the transfer buffer 3b and to the clock input terminal of DFF 13b. The input terminal of one AND gate of the composite gate 14b is connected to the Q output terminal of DFF 13b and to the carry output terminal (CRYOUT) of the adder 63 of the main circuit, and the input terminal of the other AND gate is connected to the Q output terminal of DFF 13b and to the output terminal of the inverter 24b. The input terminal of the inverter 24b is connected to the carry output terminal (CRYOUT) of the adder 63 of the main circuit. The Q output terminal of DFF 13b for ST1 signal and the Q output terminal thereof for ST1B signal are connected to the same signal line shown in FIGS. 24A and 24B. The D input terminal of DFF 13b is connected to the output terminal of the comparator 12b, the minus input terminal of the comparator 12b is connected to the output terminal of the reference voltage Vref whose one end being grounded, and the plus input terminal thereof is inputted with the controlled power supply voltage Vin. The carry output terminal of the counter 18b is connected to the S input terminal of RSFF 20b, the clock input terminal of the counter 18b is connected to the output terminal of the composite gate 21b, and the load terminal thereof is connected to the main PWM signal line (PMW1OUT). This signal line is also connected to the R input terminal of RSFF 20b and to the reset terminal of the frequency divider circuit 19b. The Q output terminal of RSFF 20b is connected to one input terminal of the two-input AND gate 22b whose other input terminal is connected to the external trigger terminal (MSTRG). The output terminal of the two-input AND gate 22b is connected to the S input terminal of RSFF 5b. The clock input terminal of the frequency divider circuit 19b is connected to the output terminal of the inverter 23b whose input terminal is connected to a counter clock signal terminal (SUM2O). The output terminal Qn of the frequency divider circuit 19b is connected to an input terminal of the OR gate of the composite gate 21b. One input terminal of the AND gate of the composite gate 21b is connected to the system clock terminal (TSET), and the other input terminal is connected to a main PWMH period setting signal terminal (CHG1ON).

The operation of the circuit of the third related art will be described with reference to the timing chart shown in FIGS. 26A to 26H. During the L period of the main PWM signal, the addition data of the adder 63 of the main circuit 5 is latched by the latch 2b in response to an H output of the AND gate 15b supplied with the system clock and data setting signal. The data latched by the latch 2b is inverted by the inverter 4b and inputted to the counter 1b. Since the counter 1b is in the load state, the inverted value of the data latched by the latch 2b is loaded in the counter 1b at the rise timing of the $\overline{Q}$ of DFF 9b inputted to the clock input terminal. When the output H of the main PWM signal or the Q output H of RSFF 5b by an external trigger is inputted to the OR gate 6b, the Q output of the latch 7b becomes H synchronously with the rise timing of the clock of the free-run counter 26 of the main circuit and the load state of the counter 1b is released. Thereafter, in response to the rise timing of the Q of DFF 9b, the counter 1b counts up and if a carry is outputted, the AND gate outputs H so that RSFF 17b outputs the main synchronism sub PWM signal of H (refer to t1, a, c, d, and h in FIGS. 26A to 26H). Thereafter, the main PWML period setting signal generated in response to the fall timing of the main PWM signal resets RSFFs 5b and 7b so that the main synchronism sub PWM signal becomes L (refer to t2, a, e, and h in FIGS. 26A to 26H). At the same time, the counter 1b again enters the load state. The data setting signal opens the gate of the buffer 3b so that the data latched by the latch 2b is inputted to the adder 63 of the main circuit. The new addition data of the adder 63 is inputted and set to the latch 2b in response to the output H of the AND gate 15b. The addition data set to the latch 2b is checked, from the Q output of DFF 13b supplied with an output of the comparator 12b, whether it is larger or smaller than the data before the addition at the main circuit. However, all data bits are inverted by the inverter 4b. Therefore, if the value of the set data increases, the carry generation time as from the count start of the counter 1b becomes late and the rise timing of the main synchronism sub PWM signal lags relative to the rise timing of the main PWM signal. Conversely, if the value of the set data decreases, the rising timing leads. In the system where the H period (term) of the main synchronism sub PWM signal elongates and the controlled power supply voltage Vin increases, the controlled power supply voltage Vin 1ob becomes larger than the comparison voltage Vref 11b and the output of DFF 13b becomes H, or vice versa. Therefore, in the addition calculation by the adder 63 of the main circuit, the data to be added is selected so as to increase the new data set to the latch when the output of DFF 13b is H or decrease it when L. In this manner, a negative feedback can be realized. The circuit of the third related art operates as described above.

The above operation will be described in detail with reference to the circuit shown in FIGS. 23A, 23B, 24A, 24B and 25. This circuit is modified from the circuit of the second related art. The different points reside in that AND gates 7-1 and 7-2 are added, the two-input OR gates 81 and 82 of the second related art are changed to three-input OR gates 81 and 82, the output terminal of the AND gate 7-1 is connected to the third input terminal of the OR gate 82, and the output terminal of the AND gate 7-2 is connected to the third input terminal of the OR gate 81. One input terminals of the AND gates 7-1 and 7-2 are inputted with PM1ONSS signal, and the other input terminals of the AND gates 7-1 and 7-2 are inputted with ST1B and ST1 signals, respectively. The timing circuit 53 has an additional signal output terminal for PM1ONSS signal which is outputted when PWM signal is off as shown in the timing chart of FIG. 17. A CRYOUT terminal is connected to the carry output terminal (C terminal) of the adder 63. The output terminal of the adder 63 is connected to ADROUT signal terminal (bus). The operation of increasing or decreasing the value of set data by the AND gates 7-1 and 7-2 and other circuits portions is similar to the operation of count up/down by "1" by the register 3 PWM1ON of the first related art. In the circuit shown in FIGS. 24A and 24B, when DFF 13b outputs ST1 of H at the timing of PM1ONSS, the AND gate 7-2 outputs H and O1H is supplied from the latch 8 to the adder 60 to count up by "1". When ST1B is H, the AND gate 7-1 outputs H and FFH is supplied from the latch 7 to the adder 63 to count down by "1".

Next, the maximum/minimum value limit control for the data to be set to the latch 2b will be described. This control is made by inhibiting an output of the AND gate 15b by an output of the composite gate 14b. It is therefore possible to prevent the data loaded to the counter during the L period of the main PWM signal from being changed from all H to all L or vice versa.

First, the maximum value limit control will be described. It is assumed that the data set to the latch 2b is all L. In response to the rise timing of the data setting signal, the gate of the buffer 3b is opened and the adder 63 of the main circuit starts the addition calculation. At the same time, when the Q output of H is outputted from DFF 13b (i.e., when it is instructed to reduce the value of the data set to the register 2b and elongate the H period of the main synchronism sub PWM signal), all L data set to the register 2b is subjected to subtraction (addition of FFH) by the adder 63 of the main circuit so that the adder 63 does not output a carry and the inverter 24b outputs H. The output of the inverter 24b and the Q output make the composite gate 14b output L. Therefore, an output of the AND gate 15b by the data setting signal and system clock is inhibited, and the gate of the latch 2b is not opened. As a result, the addition data is not set to the latch 2b and all L state is maintained. In the above manner, the maximum value limit control is completed.

Next, the minimum value limit control will be described. It is assumed that the data set to the latch 2b is all H. In response to the rise timing of the data setting signal, the addition calculation starts. At the same time, when the Q output of H is outputted from DFF 13b (i.e., when it is instructed to increase the value of the data set to the latch 2b and shorten the H period of the main synchronism sub PWM signal), all H data set to the latch 2b is subjected to addition by the adder 63 of the main circuit so that the adder 63 outputs a carry and the inverter 24b outputs H. A logical product of this carry and the Q output makes the composite gate 14b output L. Therefore, similar to the maximum value limit control, the minimum value limit control is completed.

Next, a protect operation for the external trigger input will be described with reference to the timing charts shown in FIGS. 27A to 27I. At the rise timing of the main PWM signal, the counter 18b enters the load state and the frequency divider circuit 19b and RSFF 20b are reset. By the Q output of L from RSFF 20b, an input of the external trigger signal is intercepted at the AND gate 22b. At the same time, the main PWMH period setting signal rises. A logical product of this signal and the system clock which rises after a half period of the main PWMH period setting signal after the rising timing, makes necessary protect data from CPU be loaded to the counter 18b. When the main PWM signal falls thereafter, the load and reset states are released, and the counter 18b starts counting an output of the frequency divider circuit 19b (refer to t1 and a in FIGS. 27A to 27I). Thereafter, the counter 18b outputs a carry and the Q output of RSFF 20b becomes H to release the external trigger protect by the AND gate 22b (refer to t2, e, and f in FIGS. 27A to 27I).

As described above, according to the third related art, by using the rise timing of the power control PWM signal (main PWM signal) or the external trigger signal as a reference, the other PWM output (main synchronism sub PWM signal) can be generated with a simple circuit structure, the rise timing of the other PWM output being controlled through negative feedback of the controlled power supply voltage.

However, with the third related art, the operation of elongating or shortening the H period of the main synchronism sub PWM signal is affected by the operation of elongating or shortening the H period of the main PWM signal. A fidelity operation of counting up or down by "1" in accordance with feedback information cannot be realized except while the main PWM signal is in the maximum value limit state. Specifically, the data obtained by negative feedback control and loaded in the counter 1b of the main synchronism sub PWM generator unit is not correctly the data of the H period of the main synchronism sub PWM signal itself, but is the data representative of the period from the rise timing of the main PWM signal to the rise timing of the main synchronism sub PWM signal, and so the H period of the main synchronism sub PWM signal is determined indirectly. Therefore, if the main synchronism sub PWM generator unit updates data for elongating the H period through "1"-down of the time difference from the rise timing of the main PWM signal and if the H period of the main PWM signal has been changed by "1"-up, then the H period of the main synchronism sub PWM signal is changed by "2"-up. Conversely, if the H period of the main PWM signal has been changed by "1"-down, the H period of the main synchronism sub PWM signal does not change. Furthermore, if the main synchronism sub PWM generator unit updates data for shortening the H period through "1"-up of the time difference from the rise timing of the main PWM signal and if the H period of the main PWM signal has been changed by "1"-down, then the H period of the main synchronism sub PWM signal is changed by "2"-down. Conversely, if the H period of the main PWM signal has been changed by "1"-up, the H period of the main synchronism sub PWM signal does not change.

SUMMARY OF THE INVENTION

It is an object of the present invention to provide a signal generator eliminating the above disadvantages.

It is another object of the present invention to provide a PWM signal generator and a switching power supply capable of generating a first PWM signal and a second PWM signal synchronized with the first PWM signal, the first and second PWM signals controlling the switching power supply, and capable of elongating or shortening an on-width of the second PWM signal in accordance with feedback information independently from the first PWM signal, without being affected by an operation of elongating or shortening the on-width of the first PWM signal.

The other objects of the invention will become apparent from the detailed description of embodiments and appended claims, when read in connection with the accompanying drawings.

BRIEF DESCRIPTION OF THE DRAWINGS

FIG. 2 is comprised of FIGS. 2A and 2B showing block diagrams of the main PWM output unit of the embodiment.

FIG. 5 shows waveforms illustrating a change in a main PWM signal and a main synchronism sub PWM signal according to an embodiment of the invention.

FIG. 6 shows waveforms illustrating a change in the main PWM signal and main syncrhonism sub PWM signal of the embodiment.

FIG. 23 is comprised of FIGS. 23A and 23B showing block diagrams of a PWM signal generator of the third related art.

FIGS. 26A to 26H are timing charts illustrating the operation of the main synchronism sub PWM output unit of the third related art.

FIGS. 27A to 27I are timing charts illustrating the operation of the main synchronism sub PWM output unit of the third related art.

DETAILED DESCRIPTION OF THE PREFERRED EMBODIMENTS

Embodiments of the invention will be described in detail with reference to the accompanying drawings.

Figure 1B:
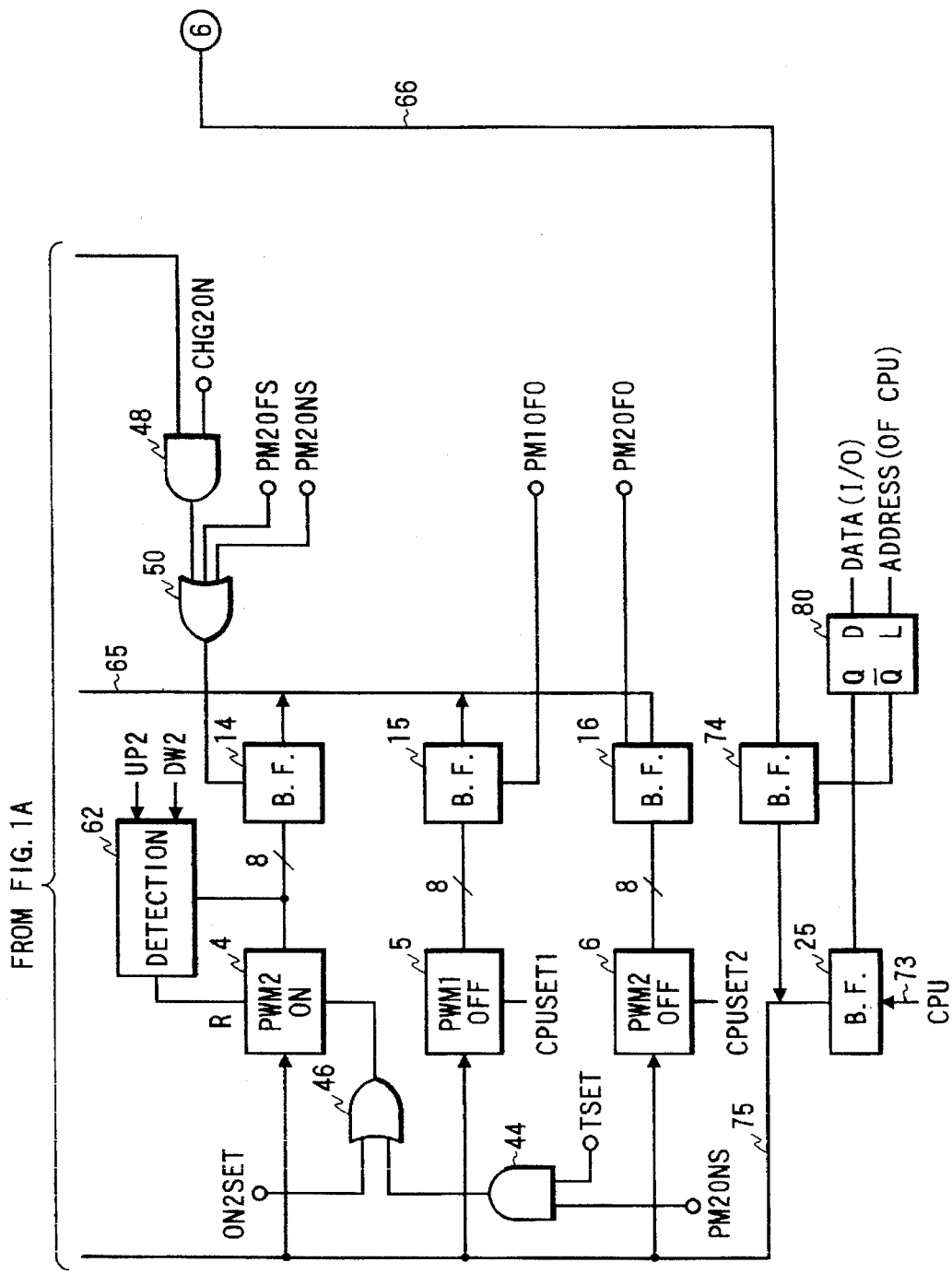
FIG. 1 is comprised of FIGS. 1A and 1B showing block diagrams of a main PWM output unit according to an embodiment of the invention.
Figure 3:
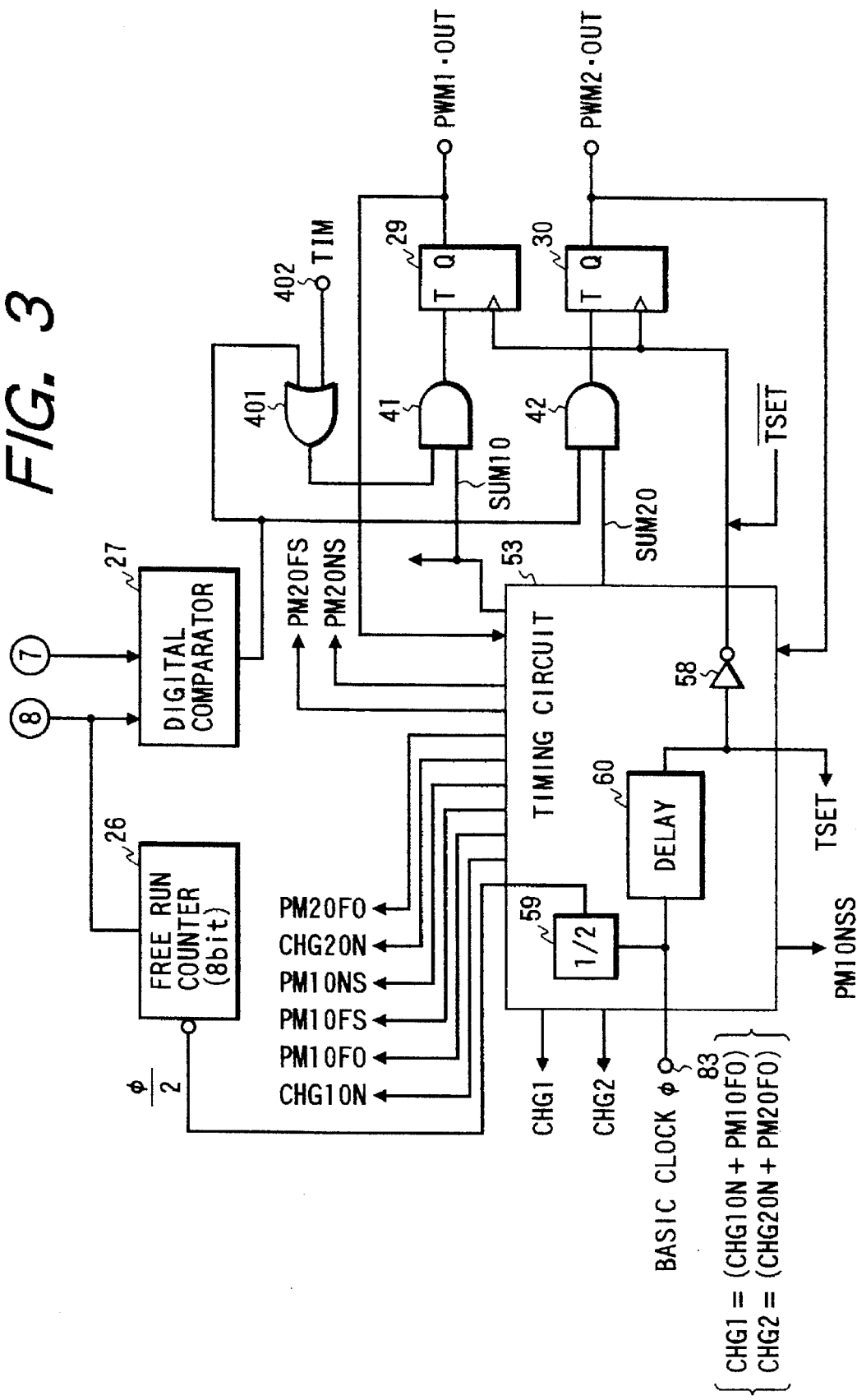
FIG. 3 is a block diagram of the main PWM output unit of the embodiment.
Figure 4B:
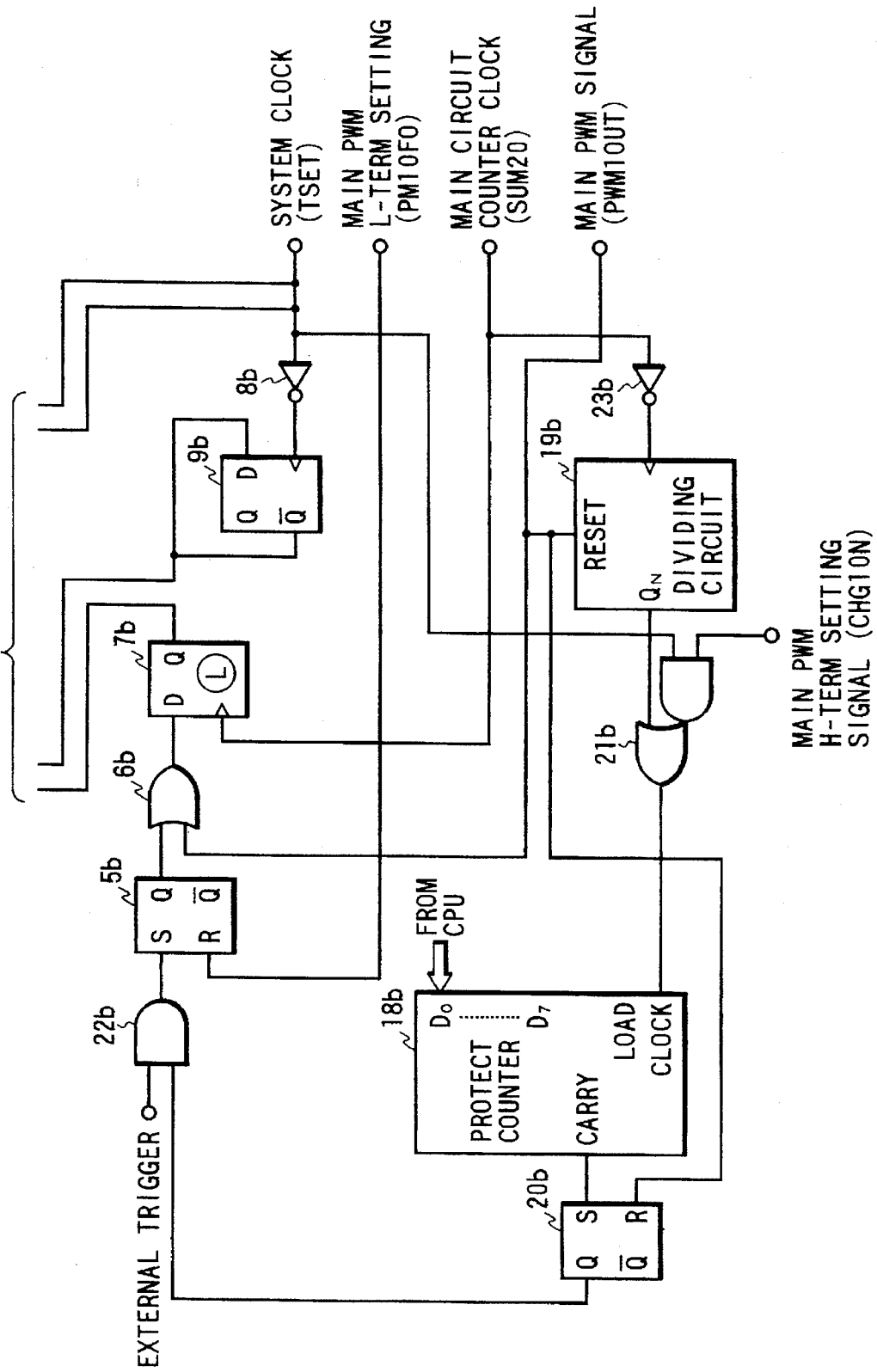
FIG. 4 is comprised of FIGS. 4A and 4B showing block diagrams of a main synchronism sub PWM output unit according to an embodiment of the invention.
Figure 7:
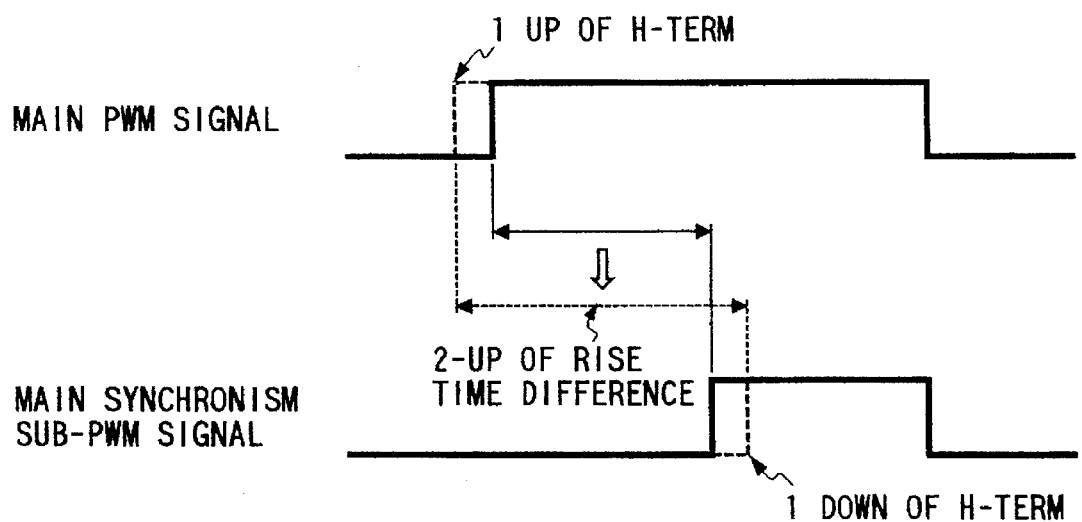
FIG. 7 shows waveforms illustrating a change in the main PWM signal and main synchronism sub PWM signal of the embodiment.
Figure 8:
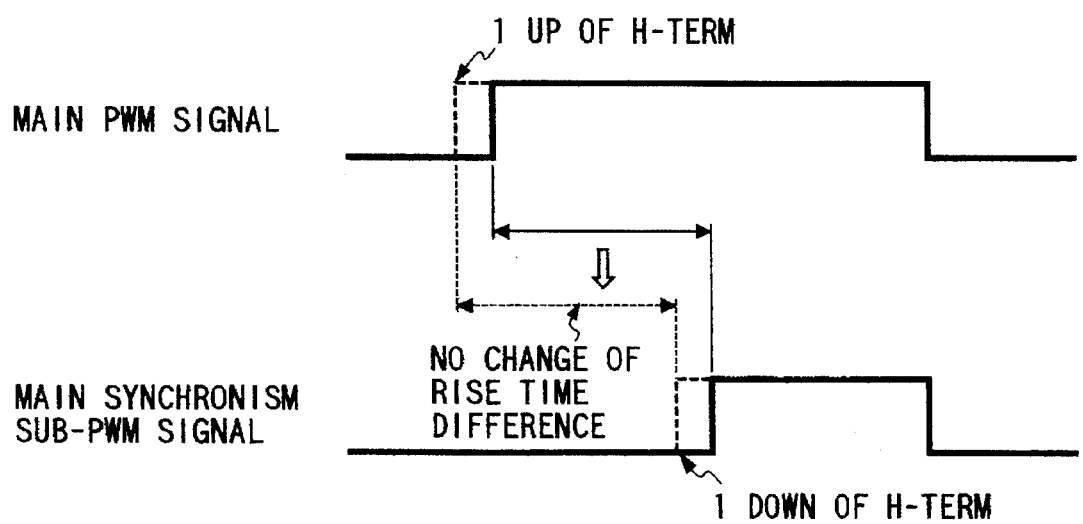
FIG. 8 shows waveforms illustrating a change in the main PWM signal and main synchronism sub PWM signal of the embodiment.

FIGS. 1A, 1B, 2A, 2B and 3 are block diagrams of a main PWM output unit of a PWM signal generator according to an embodiment of the invention. FIGS. 4A and 4B are block diagrams of a main synchronism sub PWM output unit of the PWM signal generator of the embodiment. Since the fundamental structure and operation are similar to the third related art, only the different points will be described.

As different from the third related art, in the main PWM output unit of this embodiment, an AND gate 100 and an inverter 101 are added, the latches 7 and 8 are deleted, the AND gate 100 is inputted with PM1ONSS and an $\overline{Q}$ output of DFF31, an output of the AND gate is supplied to the lower second bit of the buffer 20 and via the inverter 101 to LSB of the buffers 19 and 20. The other input terminals of the buffer 19 are pulled up to a power supply voltage VDD, and the other input terminals of the buffer 20 are pulled down to the ground potential VSS. The $\overline{Q}$ outputs of DFF 28 and DFF 31 are supplied to the main synchronism sub PWM output unit.

In the main synchronism sub PWM output unit, a NAND gate 25b and a composite gate 26b are added, the $\overline{Q}$ outputs of DFF 28 and DFF 31 are supplied to the NAND gate 25b, an output of the NAND gate 25b and the $\overline{Q}$ output of DFF 13b are supplied to one AND gate of the composite gate 26b, and the $\overline{Q}$ output of DFF 28 and the Q output of DFF 13b are supplied to the other AND gate of the composite gate 26b. A logical sum of the outputs of the two AND gates is supplied to an additional input terminal of the AND gate 15b.

The correction operation of the main synchronism sub PWM signal of this embodiment will be described with reference to FIGS. 5 to 8. FIGS. 5 to 8 illustrate a change in the output of the main synchronism sub PWM signal with a change in the output of the main PWM signal. In FIGS. 5 to 8, a waveform of a solid line is before the change, and a waveform of a broken line is after the change. It is assumed here that the main synchronism sub PWM signal is neither in a maximum value limit state nor in a minimum value limit state and that the composite gate 14b is outputting H.

First, an operation of "1"-down of the H period (term) of the main PWM signal will be described. When the circuit enters the operation of the "1"-up of the H period of the main synchronism sub PWM signal, the gate of the buffer 19 is opened at the fall timing of PM1ONSS. Since the main PWM signal is under the down-operation, the maximum value limit control is not operated. Since the $\overline{Q}$ output of DFF 31 is H, an output of the AND gate 100 is H so that L is inputted to LSB of the buffer 19 via the inverter 101. The buffer 19 then outputs an addition value of FEH. In the main synchronism sub PWM output unit, since the main PWM signal is under the down-operation, the $\overline{Q}$ output of L of DFF 28 is inputted to the NAND gate 25b. With the output H of the NAND gate 25b and the $\overline{Q}$ output of H of DFF 13b for supplying "1"-up information to the main synchronism sub PWM signal, the composite gate 26b outputs H. Accordingly, in response to an output of a logical product of PM1ONSS and $\overline{TSET}$, new data added with an output FEH of the buffer 19 is set to the latch 2b, and the rise time difference between the main synchronism sub PWM signal to be outputted by the new data and the main PWM signal is reduced by two counter clocks. Therefore, the H period of the main synchronism sub PWM signal is changed by "1"-up without being affected by the "1"-down of the main PWM signal (refer to FIG. 5).

Next, when the circuit enters the operation of the "1"-down of the H period of the main synchronism sub PWM signal, in the main synchronism sub PWM output unit, in response to the $\overline{Q}$ outputs of L of DFF 28 and DFF 13b, the composite gate 26b outputs L so that a logical product of PM1ONSS and $\overline{TSET}$ at the AND gate 15b is intercepted and the latch 2b does not update the data. Therefore, although the rise timing difference between the main PWM signal and the main synchronism sub PWM signal does not change, the "1"-down of the main PWM signal is directly reflected upon the main synchronism sub PWM signal, and the H period of the main synchronism sub PWM signal is changed by "1"-down (Refer to FIG. 6).

Next, an operation will be described wherein the H period of the main PWM is changed by "1"-up and the new data does not exceed the maximum limit value. When the circuit enters the operation of the "1"-down of the H period of the main synchronism sub PWM signal, the gate of the buffer 20 is opened at the rise timing of PM1ONSS. Since the $\overline{Q}$ output of DFF 31 is H although the main PWM signal is under the maximum value limit control, the output of the AND gate 100 becomes H which is inputted to the lower second bit of the buffer 20, and LSB is supplied with L via the inverter 101. Therefore, the addition value 02H is outputted. In the main synchronism sub PWM output unit, since the main PWM signal is under the up-operation, the Q output of H of DFF 28 and the Q output of H of DFF 13b for supplying "1"-down information to the main synchronism sub PWM signal make the composite gate 26b output H. Accordingly, in response to an output of a logical product of PM1ONSS and $\overline{TSET}$, new data added with an output 02H of the buffer 20 is set to the latch 2b, and the rise time difference between the main synchronism sub PWM signal to be outputted by the new data and the main PWM signal is increased by two counter clocks. Therefore, the H period of the main synchronism sub PWM signal is changed by "1"-down without being affected by the "1"-up of the main PWM signal (refer to FIG. 7).

Next, when the circuit enters the operation of the "1"-up of the H period of the main synchronism sub PWM signal, in the main synchronism sub PWM output unit, in response to the $\overline{Q}$ outputs of H of DFF 28 and DFF 31, the NAND gate 25b outputs L. With this output L and the Q output L of DFF 13b, the composite gate 26b outputs L so that a logical product of PM1ONSS and $\overline{TSET}$ at the AND gate 15b is intercepted and the latch 2b does not update the data. Therefore, although the rise timing difference between the main PWM signal and the main synchronism sub PWM signal does not change, the "1"-up of the main PWM signal is directly reflected upon the main synchronism sub PWM signal, and the H period of the main synchronism sub PWM signal is changed by "1"-up (Refer to FIG. 8).

Next, an operation will be described even if the H period of the main PWM signal is to be changed by "1"-up, it does not change because of the maximum value limit control. In response to the $\overline{Q}$ output of DFF 31, the output of the AND gate 100 becomes L and the output of the inverter 101 becomes H. In response to the rise timing of PM1ONSS, FFH is outputted if the buffer 19 is opened, whereas O1H is outputted if the buffer 20 is opened. In the main synchronism sub PWM output unit, since the output of the NAND gate 25b is H because the $\overline{Q}$ output of DFF 28 is H and the $\overline{Q}$ output of DFF 31 is L, one of the two AND gates of the composite gate 26b necessarily outputs H and the composite gate 26b outputs H, with the Q or $\overline{Q}$ output of H of DFF13b being supplied. Since the output of the composite gate 26b takes H for both the up- and down-operations of the main synchronism sub PWM signal, the data in the latch 2b is necessarily updated by an output FFH of the buffer 19 or by an output O1H of the buffer 20. With this newly set data, the rise timing difference between the main PWM signal and the main synchronism sub PWM signal is either reduced or increased by one counter clock. However, since the H period of the main PWM signal does not change, a change in the newly set data of the latch 2b is reflected upon the H period of the main synchronism sub PWM signal, and the "1"-up or "1" down operation is ensured.

With this embodiment, data for determining the H period of the main synchronism sub PWM signal is corrected in accordance with whether the H period of the main PWM signal is elongated or shortened. Therefore, a PWM signal generator can be realized which performs both the fidelity "1"-up and "1"-down operations of the H period of the main synchronism sub PWM signal in accordance with feedback information of the controlled power supply voltage.

Figure 9:
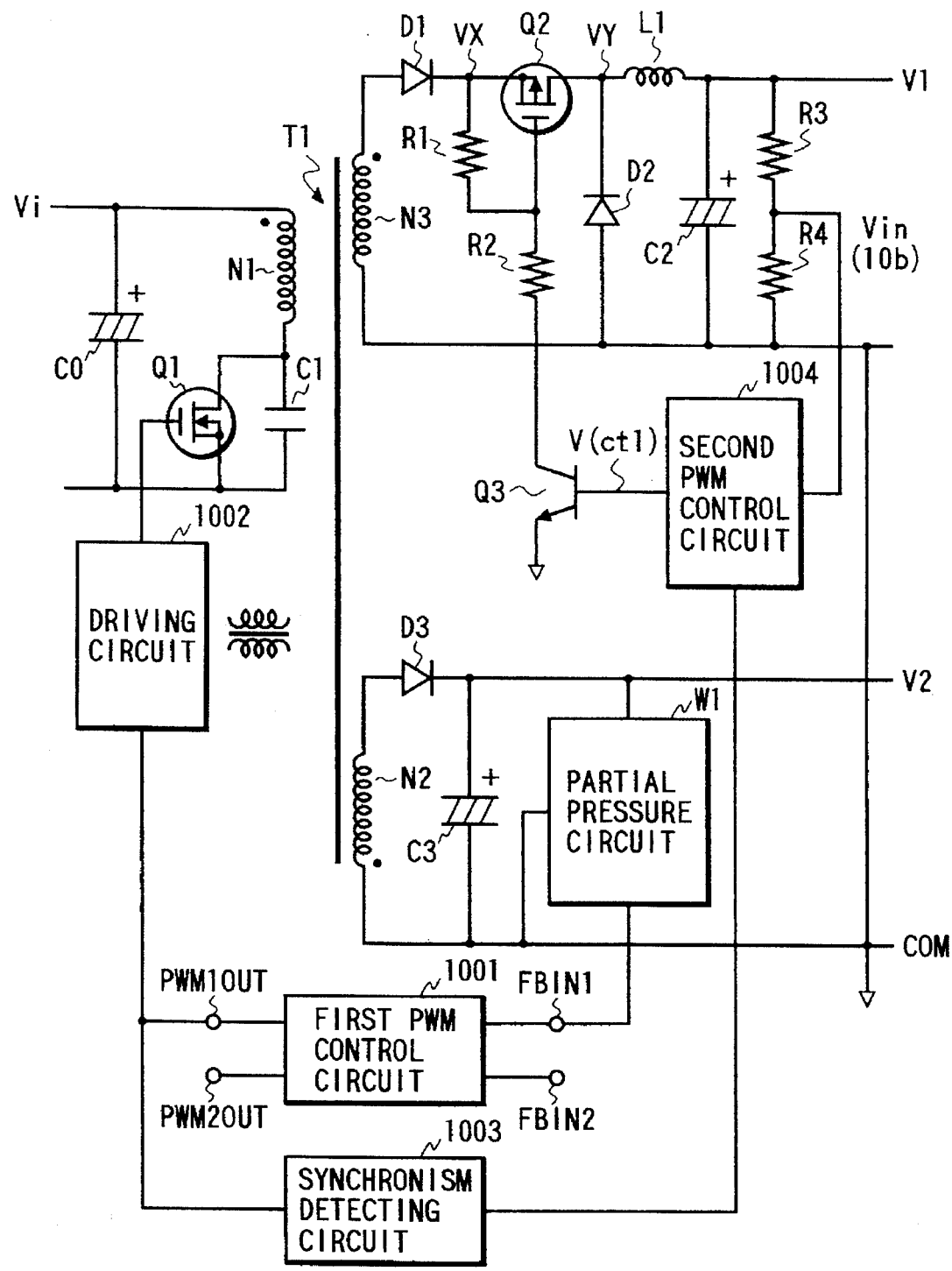
FIG. 9 is a block diagram of a switching power supply showing a first example of application of the embodiment.

FIG. 9 is a block diagram of a switching power supply as one application example of this embodiment.

The switching power supply shown in FIG. 9 has a first PWM control circuit 1001, a second PWM control circuit 1004, a driving (driver) circuit 1002, a synchronism detecting circuit 1003, and a converter transformer T1. The first PWM control circuit 1001 is constituted by the main PWM output unit of the embodiment shown in FIGS. 1A, 1B, 2A, 2B and 3. The driver circuit 1002 receives a main PWM signal (hereinafter called a "PWM1 signal") from the first PWM control circuit 1001. The second PWM control circuit 1004 is constituted by the main synchronism sub PWM output unit shown in FIGS. 4A and 4B and outputs a main synchronism sub PWM signal (hereinafter called a "PWM2 signal") in cooperation with the synchronism detecting circuit 1003.

The transformer T1 has one primary winding N1 and two secondary windings N2 and N3.

One end of the primary winding N1 is connected to a plus terminal of a d.c. power supply DC for supplying a voltage Vi, and the minus terminal of the d.c. power supply DC is connected to a reference potential. This voltage Vi may be a voltage obtained by full-wave rectifying a commercial power and smoothing it by a capacitor C0.

The other end of the primary winding N1 is connected to the drain of an FET Q1 serving as a switching element and to one end of a capacitor C1. The source of FET Q1 and the other end of the capacitor C1 are connected to the reference potential. The gate of FET Q1 is connected to the output terminal of the drive circuit 1002.

One end of the secondary winding N2 is connected to the anode of a diode D3, and the other end thereof is connected to a common reference potential (hereinafter called a "COM potential"). A voltage V2 proportional to a winding ratio of the secondary winding N2 to the primary winding N1 is induced across the secondary winding N2.

The cathode of the diode D3 is connected to the plus terminal of a smoothing capacitor C3, and the minus terminal thereof is connected to the COM potential.

The cathode of the diode D3 is connected to a partial pressure (voltage divider) circuit W1 across which the capacitor C3 is connected in parallel. The voltage divider circuit W1 divides the voltage V2, the divided voltage being supplied to the first PWM control circuit 1001 as a feedback signal.

The first PWM control circuit receives the feedback signal from the voltage divider circuit W1 at its input terminal FBIN1, and in accordance with this feedback signal, generates a pulse signal (PWM1 signal) with a controlled pulse width. The pulse width of the PWM1 signal is controlled to make it wide or narrow in the unit of integer multiple of a minimum unit width in accordance with the level of the feedback signal. The PWM1 signal is supplied from the output terminal PWM1OUT to the driver circuit 1002 and synchronism detector circuit 1003. The first PWM control circuit 1001 of this embodiment has auxiliary terminals including an input terminal FBIN2 and an output terminal PWM2OUT.

In response to the PWM1 signal, the driver circuit 1002 turns on and off FET Q1. This switching operation is performed so as to turn on FET Q1 during the on-width of the PWM1 pulse signal.

The synchronism detecting circuit 1003 detects the output timing of the PWM1 signal from the first PWM control circuit 1001, and generates a synchronism detection signal representative of the detection result.

One end of the secondary winding N3 is connected to the anode of a diode D1, and the other end thereof is connected to the COM potential. A voltage V1 proportional to a winding ratio of the secondary winding N3 to the primary winding N1 is induced across the secondary winding N3.

The cathode of the diode D1 is connected to the drain of MOSFET Q2 serving as a switching element and to one end of a resistor R1. The source of MOSFET Q2 is connected to the cathode of a fly-wheel diode D2 (hereinafter simply called a "diode D2") and to one end of a choke coil L1. The gate of MOSFET Q2 is connected to the other end of the resistor R1 and to one end of a resistor R2. The anode of the diode D2 is connected to the COM potential.

The other end of the choke coil L1 is connected to the plus terminal of a smoothing capacitor C2. The minus terminal of the capacitor C2 is connected to the COM potential.

The other end of the choke coil L1 is connected to one end of a resistor R3 which is connected in parallel with the output capacitor C2. The other end of the resistor R3 is connected to one end of a resistor R4 whose other end is connected to the COM potential.

The resistors R3 and R4 divide a voltage V1, and the divided voltage is supplied to the second PWM control circuit 1004 as a Vin signal 10b. The second PWM control circuit 1004 generates a pulse signal (PWM2 signal) having a pulse width controlled by the Vin signal 10b, synchronously with the synchronism detection signal supplied from the synchronism detecting circuit 1003. Specifically, the PWM2 signal is generated synchronously with the PWM1 signal, and the pulse width of the PWM2 signal is controlled to make it wide or narrow in the unit of integer multiple of the minimum unit width in accordance with the level of the feedback signal.

The PWM2 signal is supplied as a V(ctl) signal to the base of a transistor Q3 which drives MOSFET Q2. In order to protect the transistor Q3, a resistor may be inserted in the base circuit of the transistor Q3. The collector of the transistor Q3 is connected to the other end of the resistor R2, and the emitter thereof is connected to the COM potential. In response to the V(ctl) signal, the transistor Q3 turns on and off so that MOSFET Q2 turns on and off. The time defined by the on-width of the V(ctl) pulse signal corresponds to the on-time of the transistor Q3, i.e., the on-time of MOSFET Q2.

Next, the operation of the switching power supply of this application example will be described.

In response to the PWM1 signal from the first PWM control circuit 1001, the FET Q1 turns on and off. With this switching operation, the voltage V2 is induced across the secondary winding N2. The voltage V2 is divided by the voltage divider circuit W1, and the divided voltage is applied to the FBIN1 terminal of the first PWM control circuit 1001. The first PWM control circuit 1001 detects the level of the divided voltage each time one pulse of the PWM1 signal is outputted, and in accordance with the detected level, controls the pulse width of the PWM1 signal to make it wide or narrow in the unit of integer multiple of the minimum unit width. With this control of the pulse width of the PWM1 signal, the feedback control to be described later can be realized and a stable output voltage V2 can be obtained.

In the main synchronism sub PWM output unit constituted by the second PWM control circuit 1004 and synchronism detecting circuit 1003, the PWM2 signal turns on and off the FET Q2 and transistor Q3. This switching operation induces the voltage V1 across the secondary winding N3. The voltage V1 is divided by the resistors R3 and R4, and the divided voltage is supplied to the second PWM control circuit 1004 as the Vin signal 10b. The second PWM control circuit 1004 detects the level of the Vin signal 10b each time one pulse of the PWM2 signal is outputted, and in accordance with the detected level, controls the pulse width of the PWM2 signal to make it wide or narrow in the unit of integer multiple of the minimum unit width. With this control of the pulse width of the PWM2 signal, the feedback control to be described later can be realized and a stable output voltage V1 can be obtained.

Figure 10:
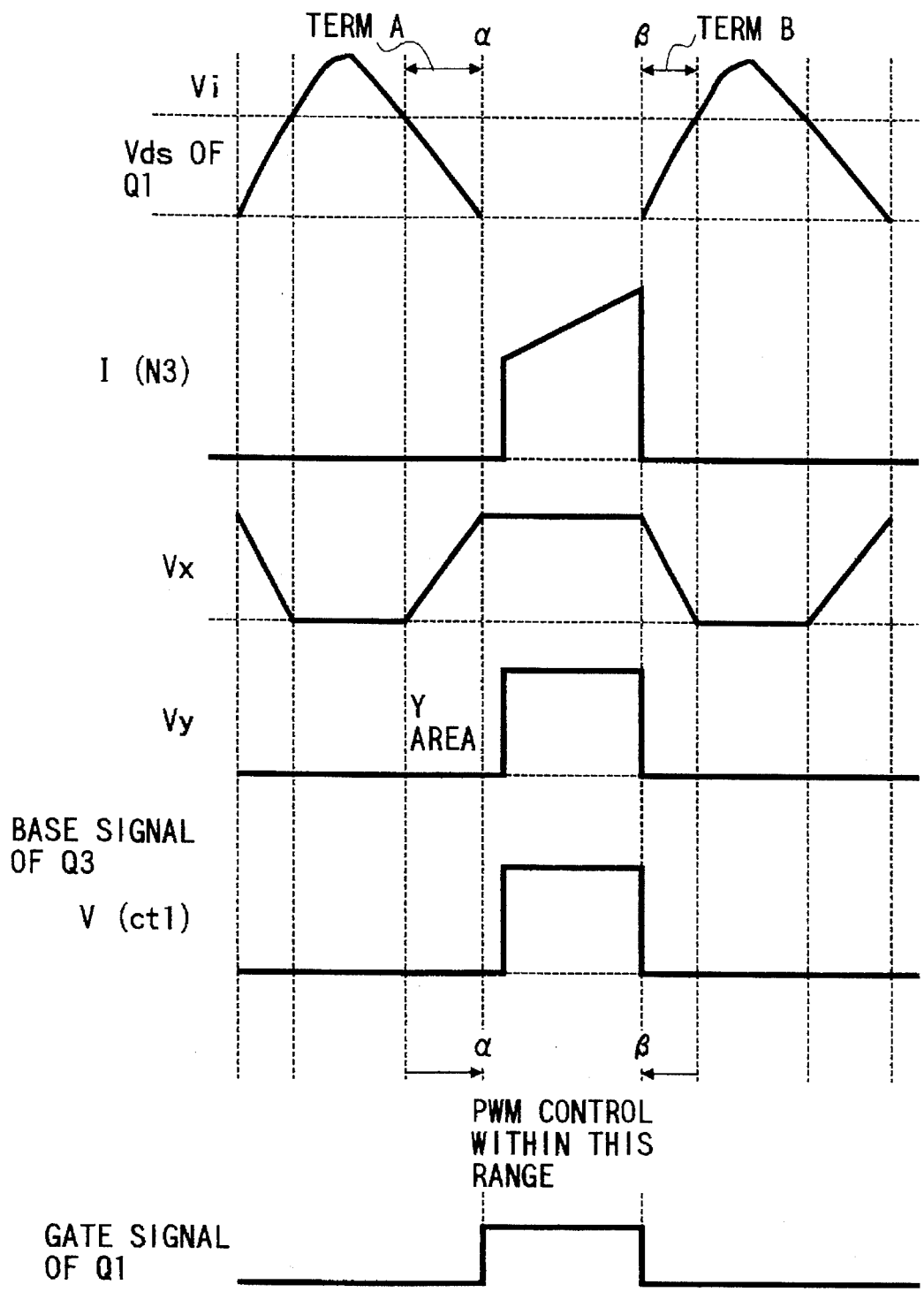
FIG. 10 is a timing chart illustrating the PWM control of the first example.

Next, the operation timings of the PWM control will be described with reference to FIG. 10. FIG. 10 is a timing chart illustrating the operation of the PWM control of the switching power supply shown in FIG. 9.

As seen from FIG. 10, the PWM1 signal turns on for a period (term) from α to β for the PWM control. The PWM2 signal (base signal of the transistor Q3) is allowed to turn on only during this period. Therefore, during the period A, current will not flow through the secondary winding N3, i.e., through the diode D1, reducing a loss in the FET Q3 and transistor T1.

Since the first PWM control circuit 1001 and main synchronism sub PWM output unit operate synchronously and the pulse width of the PWM signal does not change greatly in a short time, the very stable control without being influenced by noises can be realized. Therefore, the cost of the switching power supply can be reduced and the large power can be easily controlled.

Further, since the PWM control by the main synchronism sub PWM output unit is performed by using as a reference the rise timing of the PWM1 signal supplied from the first PWM control circuit 1001, the level of the PWM2 signal generated in the main synchronism sub PWM output unit can be set to H level only during the H level period of the PWM1 signal supplied from the first PWM control circuit 1001.

The on/off control where the on-operation of switching on the primary side of a transformer causes the on-operation on the secondary side, has a merit that a large power output can be obtained and a demerit that the output control range becomes narrow. Conversely, the on/off control where the on-operation of switching on the primary side of a transformer causes the off-operation on the secondary side, has a merit that the output control range becomes broad and a demerit that a large power output is difficult to obtain. In the switching power supply described above, the control is selectively performed so as to obtain the above merits, and the feedback control based on the comparison result of the comparator is used. Therefore, the control of a very stable and large power output can be realized economically.

Figure 11:
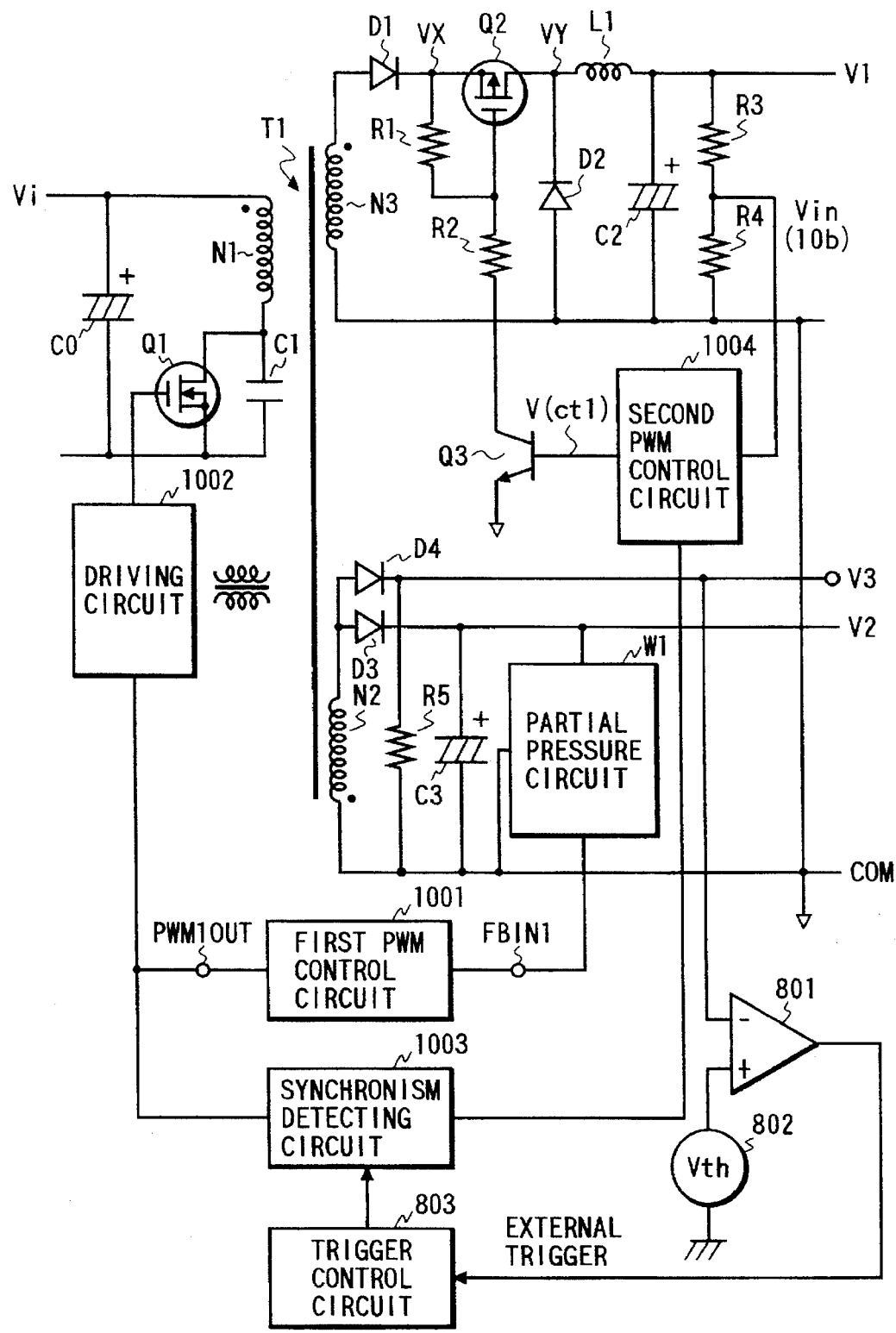
FIG. 11 is a block diagram of a switching power supply showing a second example of application of the embodiment.

FIG. 11 is a block diagram of a switching power supply as a second application example of this embodiment.

Similar to the switching power supply shown in FIG. 9, the switching power supply shown in FIG. 11 has a first PWM control circuit 1001, a driving (driver) circuit 1002, a synchronism detecting circuit 1003, a second PWM control circuit 1004, and a transformer T1. The transformer T1 has one primary winding N1 and two secondary windings N2 and N3.

One end of the primary winding N1 is connected to a plus terminal of a d.c. power supply DC for supplying a voltage Vi, and the minus terminal of the d.c. power supply DC is connected to a reference potential. A smoothing capacitor C0 is connected between the plus and minus terminals of the d.c. power supply DC. The voltage Vi may be a voltage obtained by full-wave rectifying a commercial power and smoothing it by the capacitor C0.

The other end of the primary winding N1 is connected to the drain of an FET Q1 serving as a switching element and to one end of a capacitor C1. The source of FET Q1 and the other end of the capacitor C1 are connected to the reference potential. The gate of FET Q1 is connected to the output terminal of the drive circuit 1002.

One end of the secondary winding N2 is connected to the anodes of diodes D3 and D4, and the other end thereof is connected to a common reference potential (COM potential). A voltage V2 proportional to a winding ratio of the secondary winding N2 to the primary winding N1 is induced across the secondary winding N2.

The cathode of the diode D3 is connected to the plus terminal of a smoothing capacitor C3, and the minus terminal thereof is connected to the COM potential.

The cathode of the diode D3 is connected to a partial pressure (voltage divider) circuit W1 across which the capacitor C3 is connected in parallel. The voltage divider circuit W1 divides the voltage V2, the divided voltage being supplied to the first PWM control circuit 1001 as a feedback signal.

The cathode of the diode D4 is connected to one end of a resistor R5 serving as a load resistor, and the other end thereof is connected to the COM potential. A voltage V3 appears across the resistor R5.

The first PWM control circuit receives the feedback signal from the voltage divider circuit W1 at its input terminal FBIN1, and in accordance with this feedback signal, generates a PWM1 signal with a controlled pulse width. The pulse width of the PWM1 signal is controlled to make it wide or narrow in the unit of integer multiple of a minimum unit width in accordance with the level of the feedback signal. The PWM1 signal is supplied from the output terminal PMW1OUT to the driver circuit 1002 and synchronism detector circuit 1003.

In response to the PWM1 signal, the driver circuit 1002 turns on and off FET Q1. The period defined by the on-width of the PWM1 pulse signal corresponds to the on-time of the FET Q1.

The voltage V3 is applied to a comparator 801 which compares the voltage V3 with a reference voltage Vth of a reference power supply 802 and generates a comparison signal representative of the comparison result. This comparison signal is supplied to a trigger control circuit 803 as an external trigger signal.

In response to the external trigger signal, the trigger control circuit 803 outputs a trigger signal to the synchronism detecting circuit 1003 at a predetermined timing.

The synchronism detecting circuit 1003 detects the output timing of the PWM1 signal from the first PWM control circuit 1001 and the trigger signal from the trigger control circuit 803, and generates a synchronism detection signal representative of the detection results.

One end of the secondary winding N3 is connected to the anode of a diode D1, and the other end thereof is connected to the COM potential. A voltage V1 proportional to a winding ratio of the secondary winding N3 to the primary winding N1 is induced across the secondary winding N3.

The cathode of the diode D1 is connected to the drain of MOSFET Q2 serving as a switching element and to one end of a resistor R1. The source of MOSFET Q2 is connected to the cathode of a fly-wheel diode D2 (hereinafter simply called a "diode D2") and to one end of a choke coil L1. The gate of MOSFET Q2 is connected to the other end of the resistor R1 and to one end of a resistor R2. The minus terminal of the capacitor C3 is connected to the COM potential.

The anode of the diode D2 is connected to the COM potential.

The other end of the choke coil L1 is connected to the plus terminal of a smoothing capacitor C2, and the minus terminal thereof is connected to the COM potential.

The other end of the choke coil L1 is connected to one end of a resistor R3 which is connected in parallel with the output capacitor C2. The other end of the resistor R3 is connected to one end of a resistor R4 whose other end is connected to the COM potential.

The resistors R3 and R4 divide a voltage V1, and the divided voltage is supplied to the second PWM control circuit 1004 as a Vin signal 10b. The second PWM control circuit 1004 generates a pulse signal (PWM2 signal) having a pulse width controlled by the Vin signal 10b, synchronously with the synchronism detection signal supplied from the synchronism detecting circuit 1003. Specifically, the PWM2 signal is generated synchronously with the PWM1 signal, and the pulse width of the PWM2 signal is controlled to make it wide or narrow in the unit of integer multiple of the minimum unit width in accordance with the level of the feedback signal.

The PWM2 signal is supplied as a V(ctl) signal to the base of a transistor Q3 which drives MOSFET Q2. In order to protect the transistor Q3, a resistor may be inserted in the base circuit of the transistor Q3. The collector of the transistor Q3 is connected to the other end of the resistor R2, and the emitter thereof is connected to the COM potential. In response to the V(ctl) signal, the transistor Q3 turns on and off so that MOSFET Q2 turns on and off. The time defined by the on-width (H level) of the V(ctl) pulse signal corresponds to the on-time of the transistor Q3, i.e., the on-time of MOSFET Q2.

Next, the operation of the switching power supply of this application example will be described.

The fundamental operation of the switching power supply of this application example is the same as that of the first application example, and so only different points will be described.

In the first application example, the main synchronism sub PWM output unit generates the PWM2 signal basing upon the rise timing of the PWM1 signal supplied from the first PWM control circuit 1001. Therefore, if a large power is to be outputted by using the voltage V1 induced across the secondary winding 3N, a time delay of the on-operation start caused by a delay in MOSFET Q2 and transistor Q3 is not negligible because a time difference between the rise timings of the PWM1 and PWM2 signals becomes small.

From the above reason, in this second application example, the voltage V3 synchronous with the PWM1 signal of the first PWM control circuit 1001 is compared with the reference voltage Vth by the comparator 801, and the comparison result is used as the external trigger signal to set the external trigger protect period in the main synchronism sub PWM output unit to be described later. This trigger voltage is induced on the secondary winding side when the primary winding side is in the off-operation, only during the on/off control where the on-operation of switching on the primary side of a transformer causes the off-operation on the secondary side.

Figure 12:
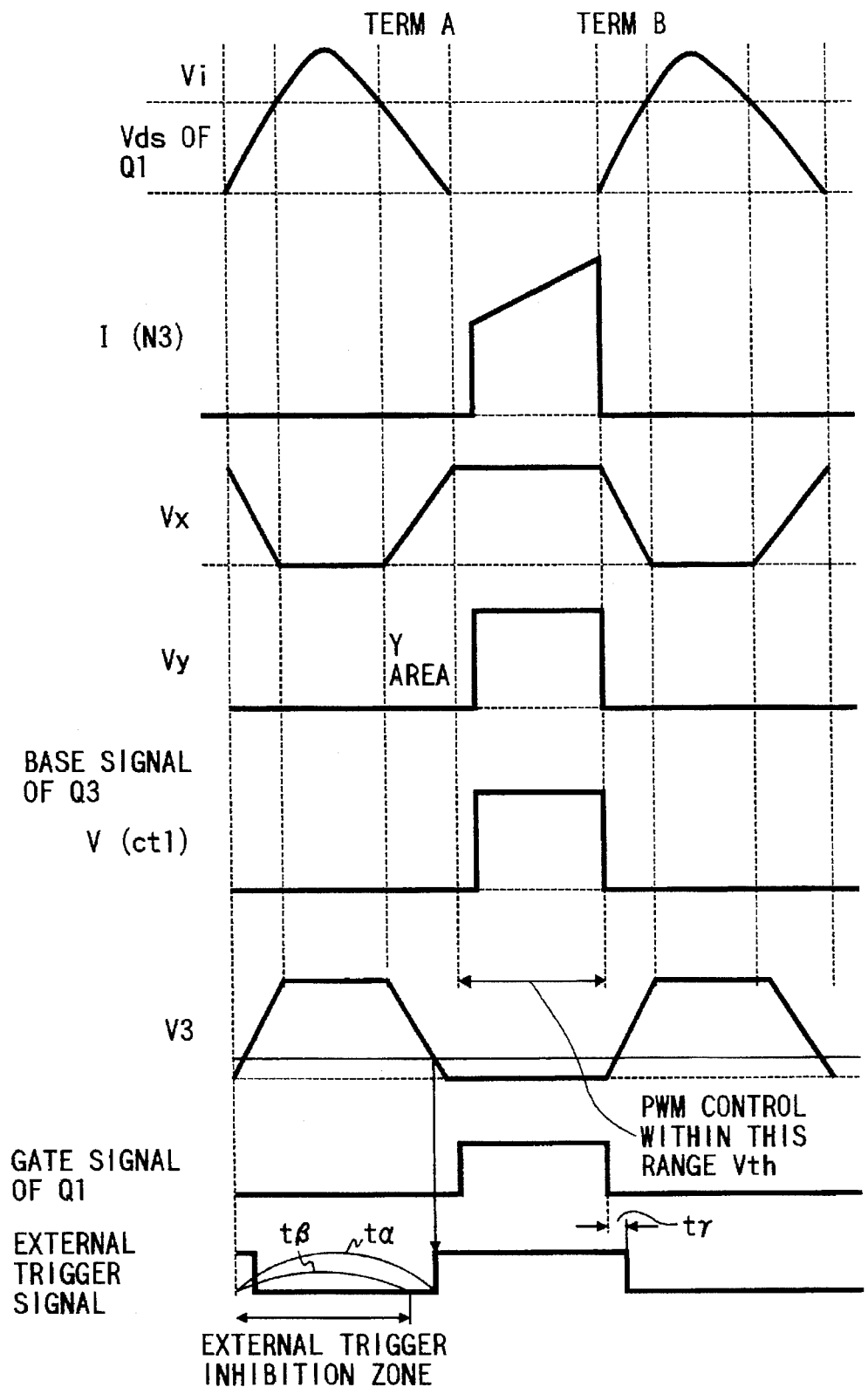
FIG. 12 is a timing chart illustrating the PWM control of the second example.
Figure 13B:
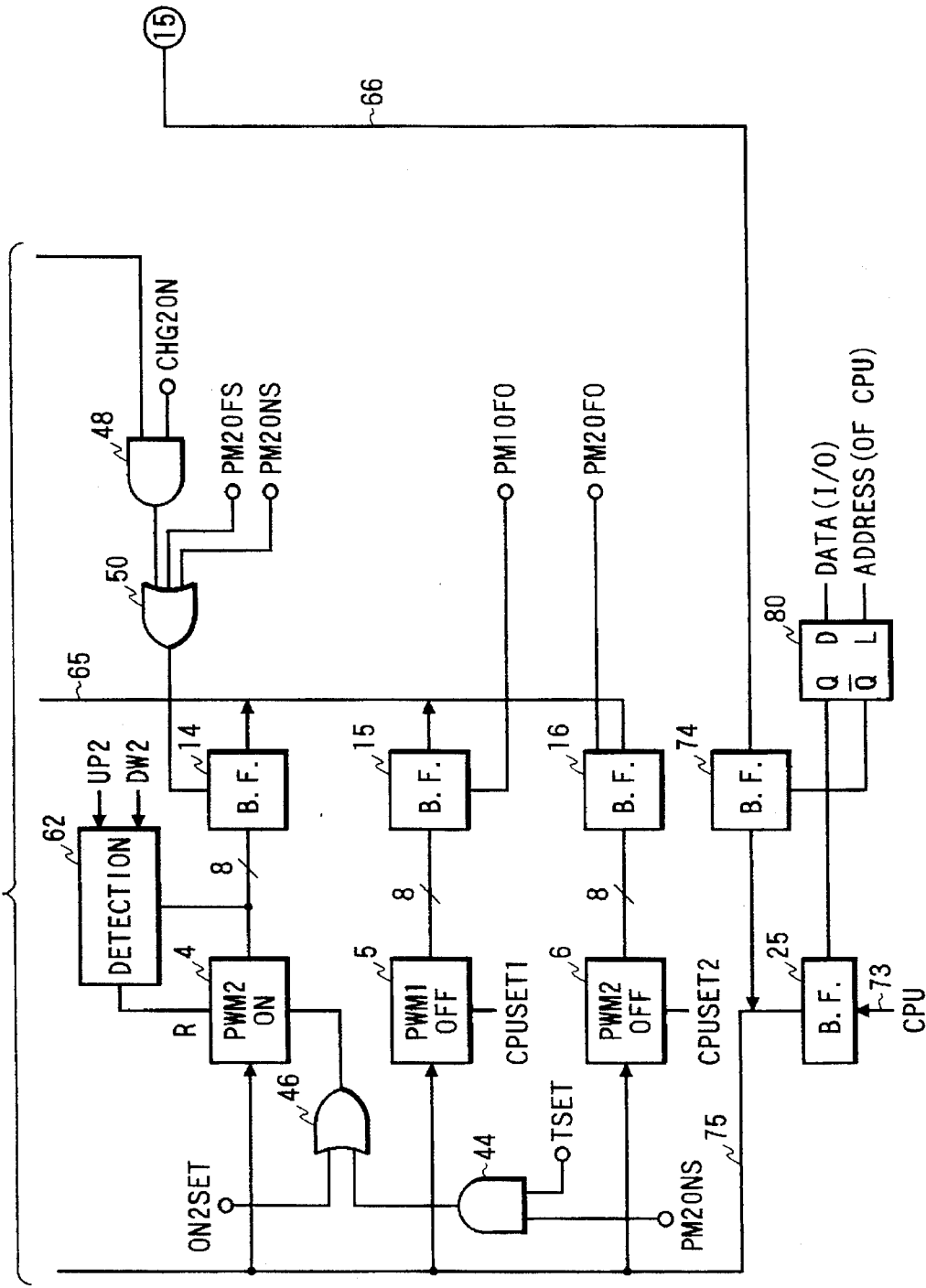
FIG. 13 is comprised of FIGS. 13A and 13B showing block diagrams of a PWM signal generator according to the first related art.
Figure 14B:
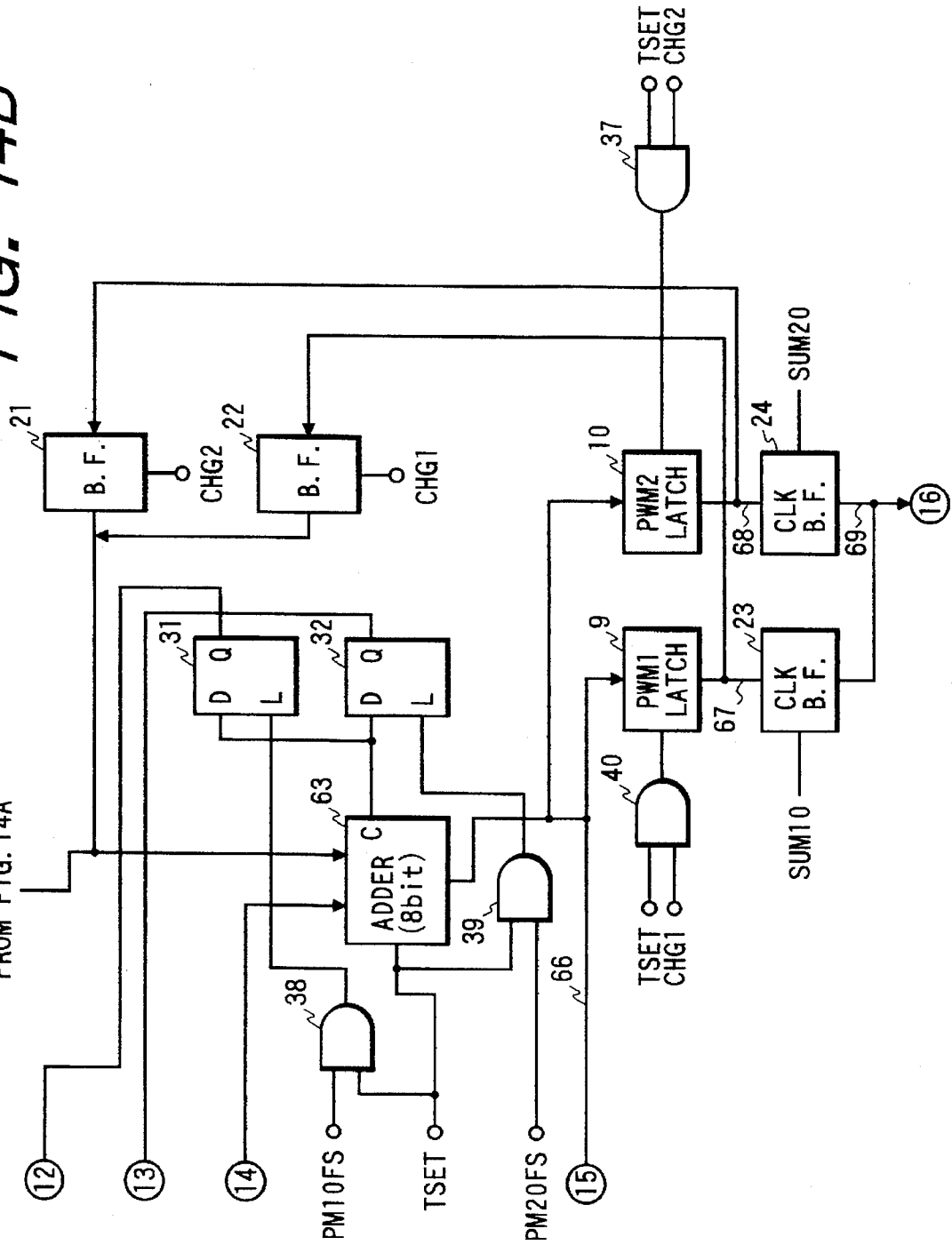
FIG. 14 is comprised of FIGS. 14A and 14B showing block diagrams of the PWM signal generator of the first related art.
Figure 15:
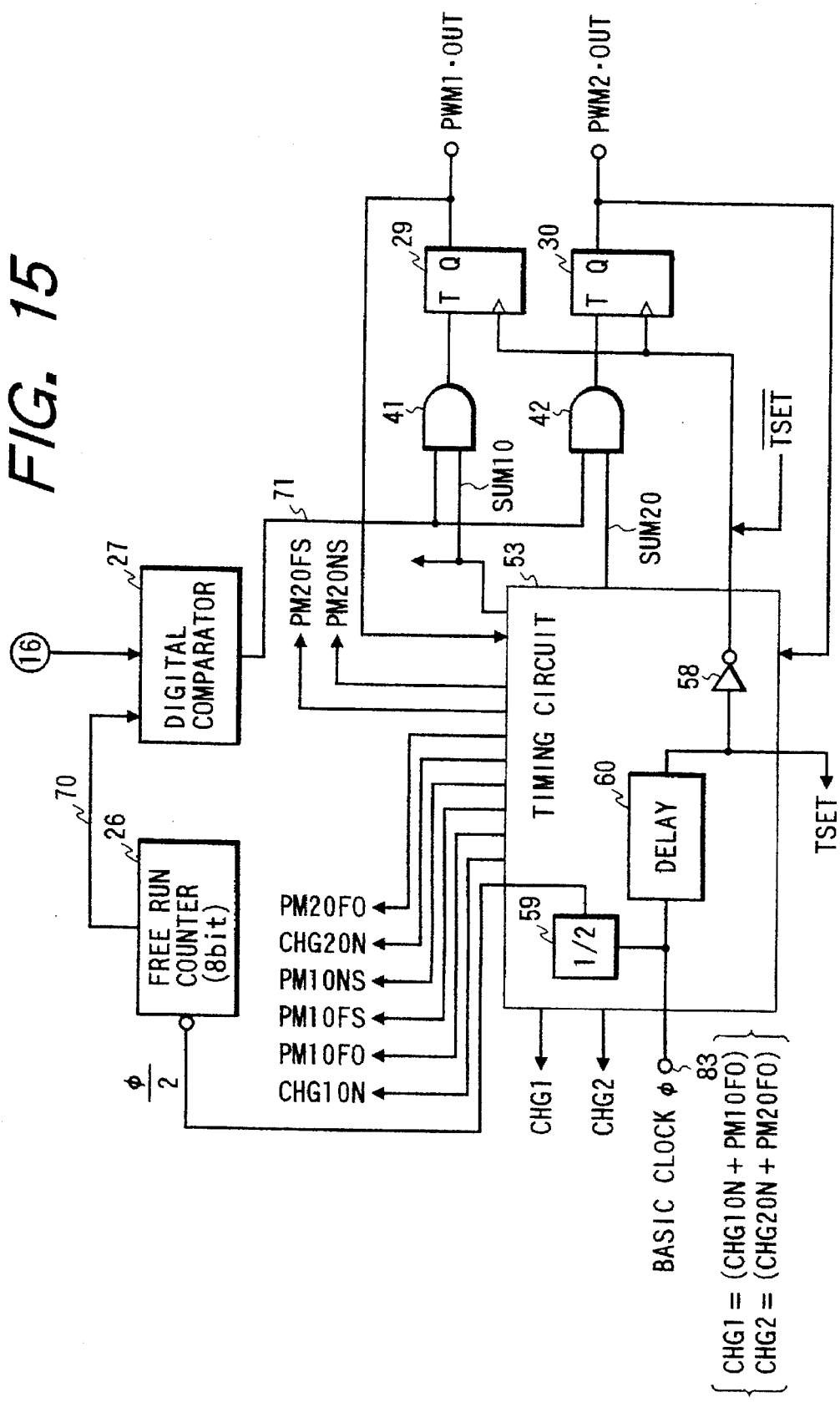
FIG. 15 is a block diagram of the PWM signal generator of the first related art.
Figure 16:
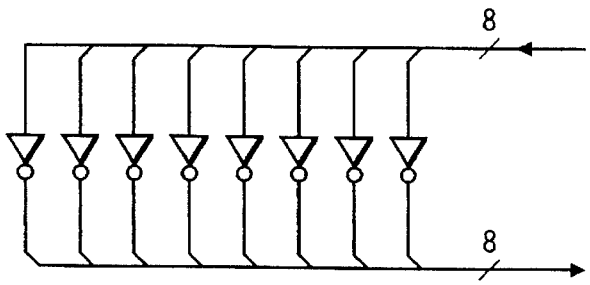
FIG. 16 shows the details of the inverter of the first related art.
Figure 17:
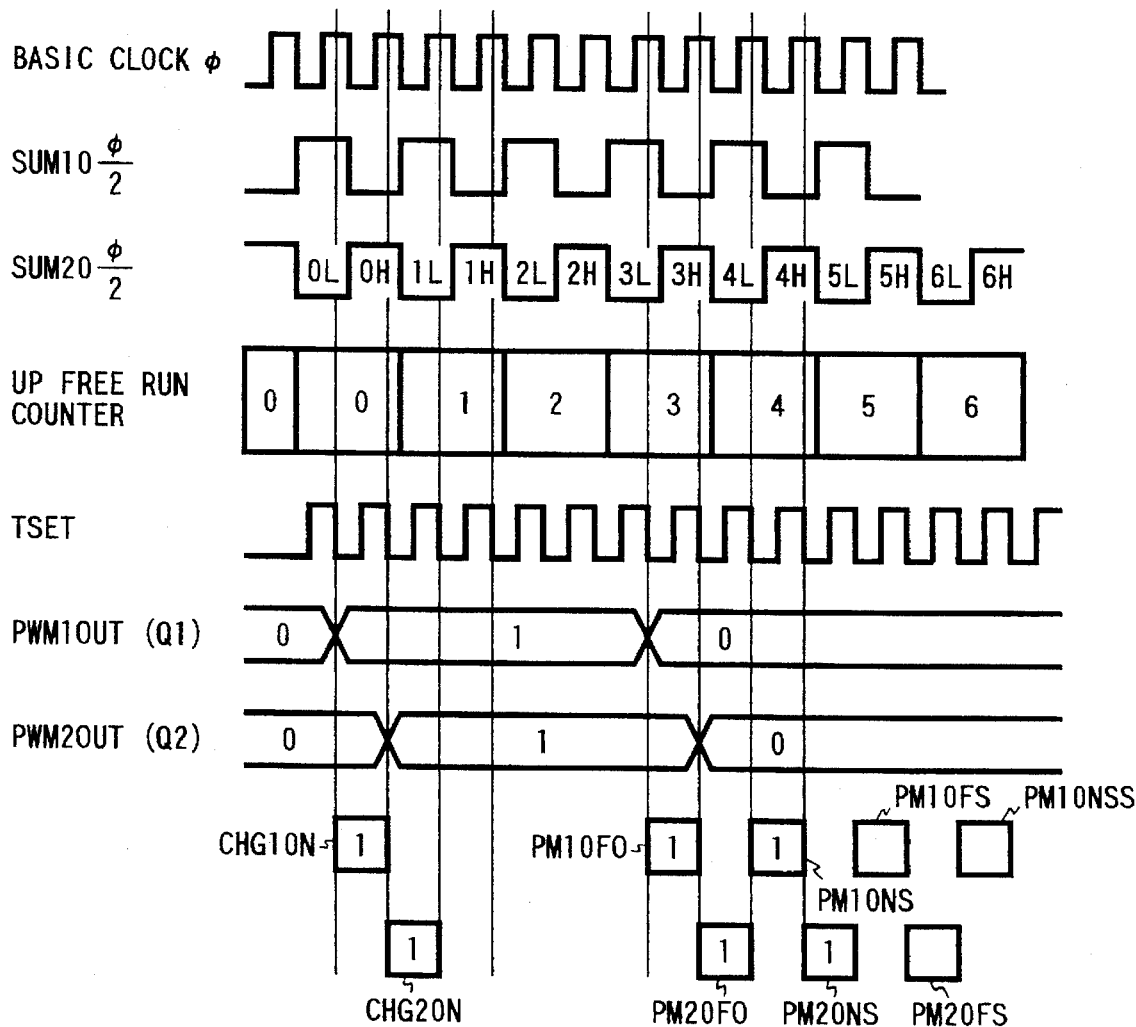
FIG. 17 is a timing chart illustrating the operation of the first related art.
Figure 18:
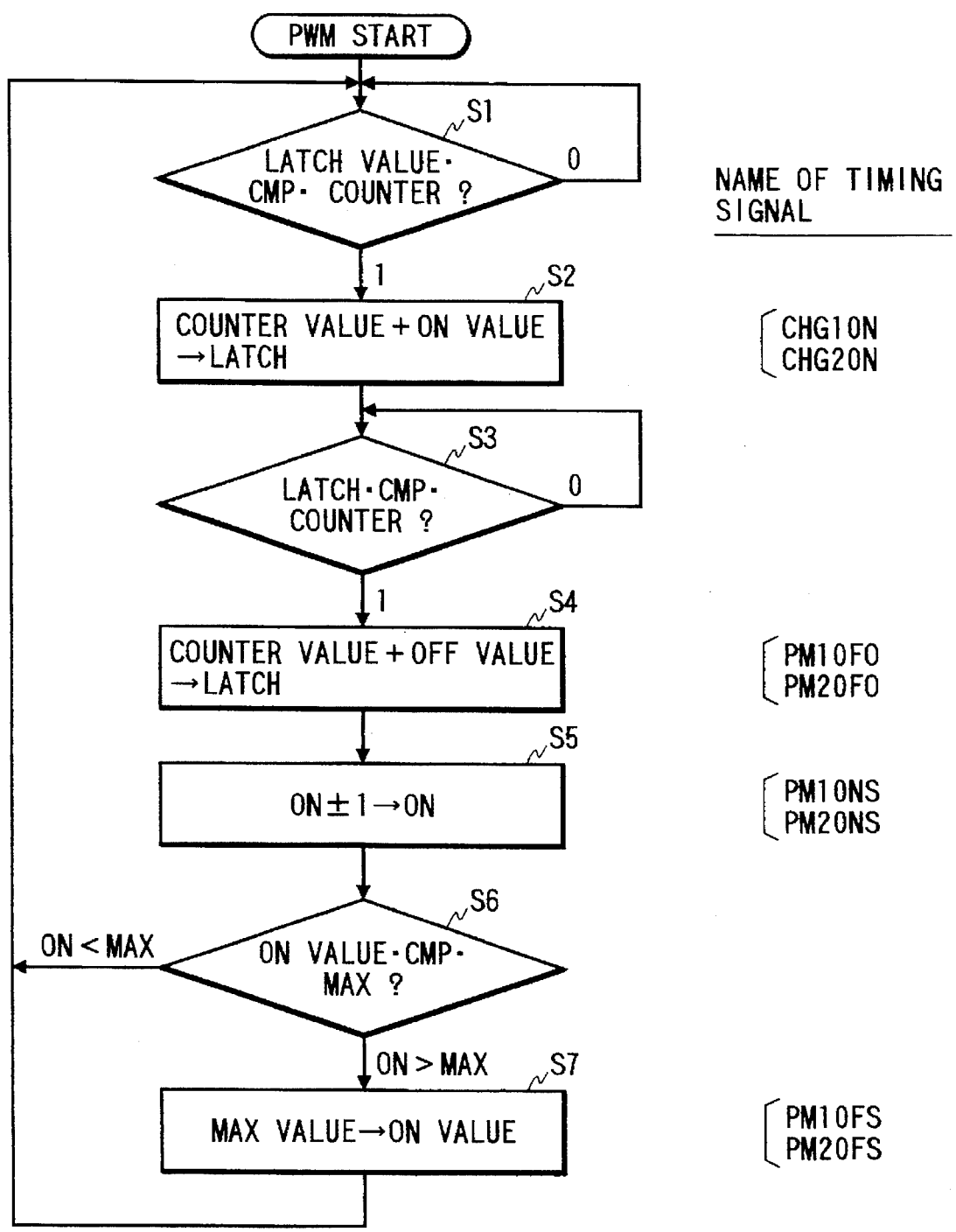
FIG. 18 is a flow chart illustrating the operation of the first related art.
Figure 19:
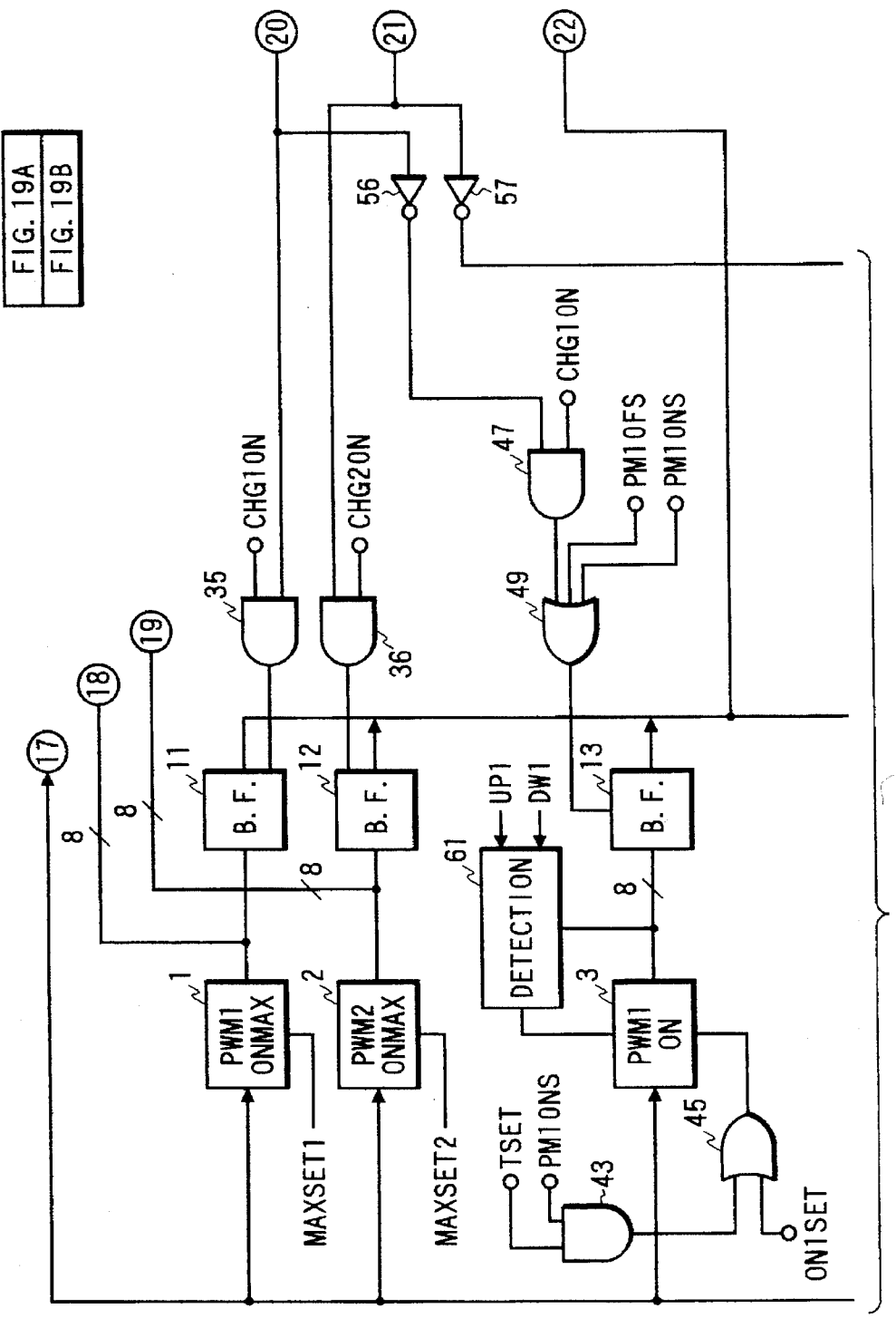
FIG. 19 is comprised of 19A and 19B showing block diagrams of a PWM signal generator according to the second related art.
Figure 19B:
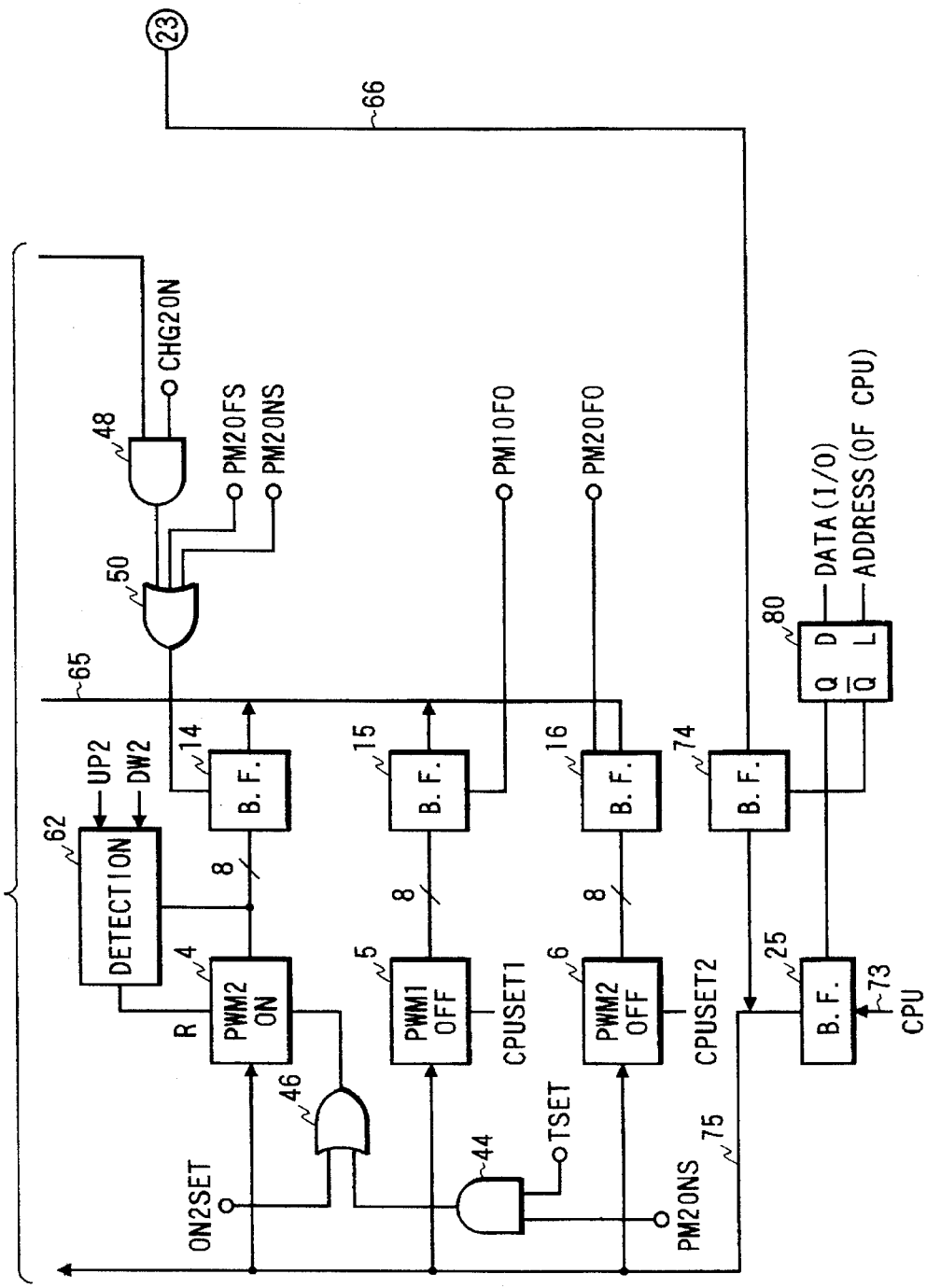
Figure 20B:
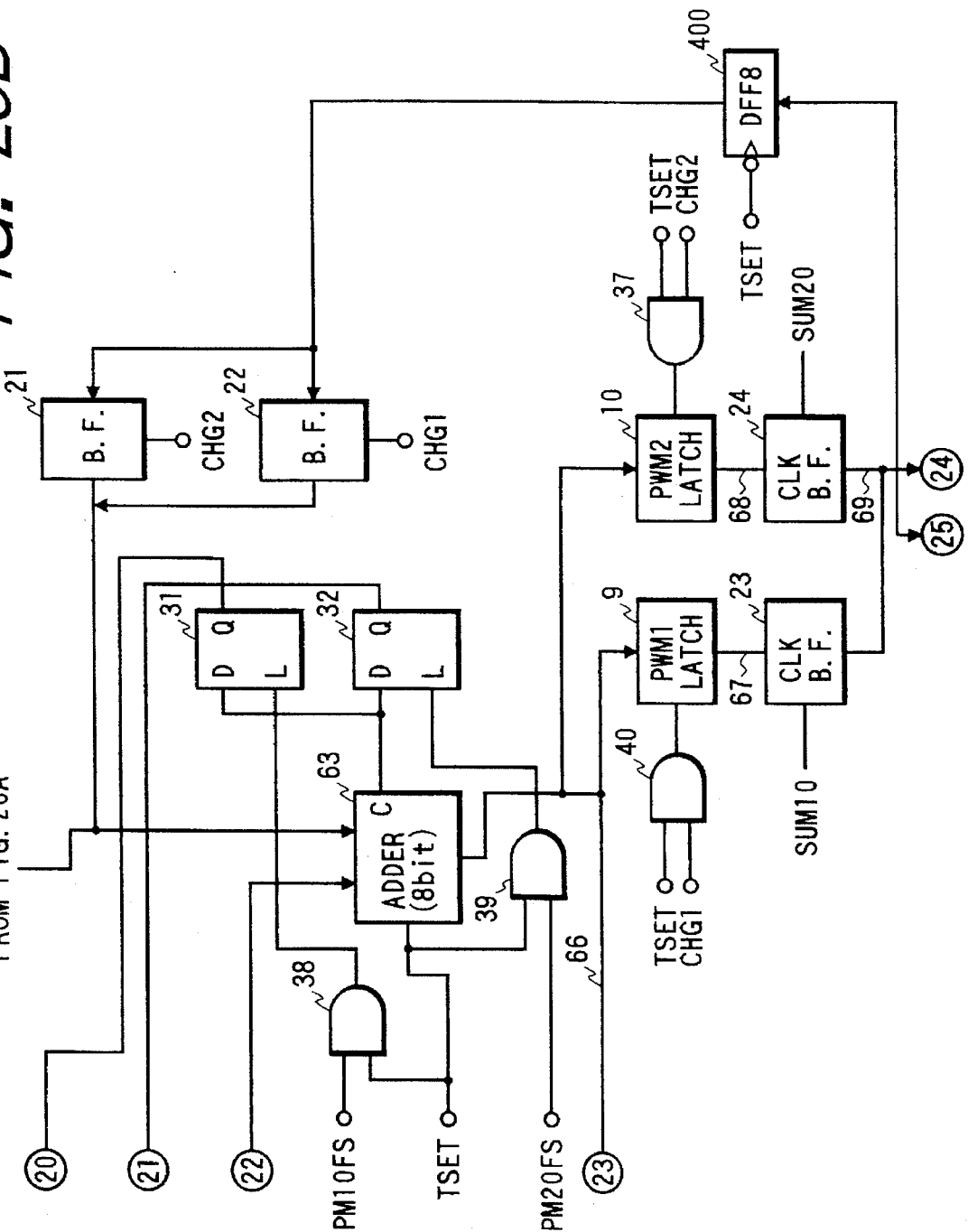
FIG. 20 is comprised of 20A and 20B showing block diagrams of the PWM signal generator of the second related art.
Figure 21:
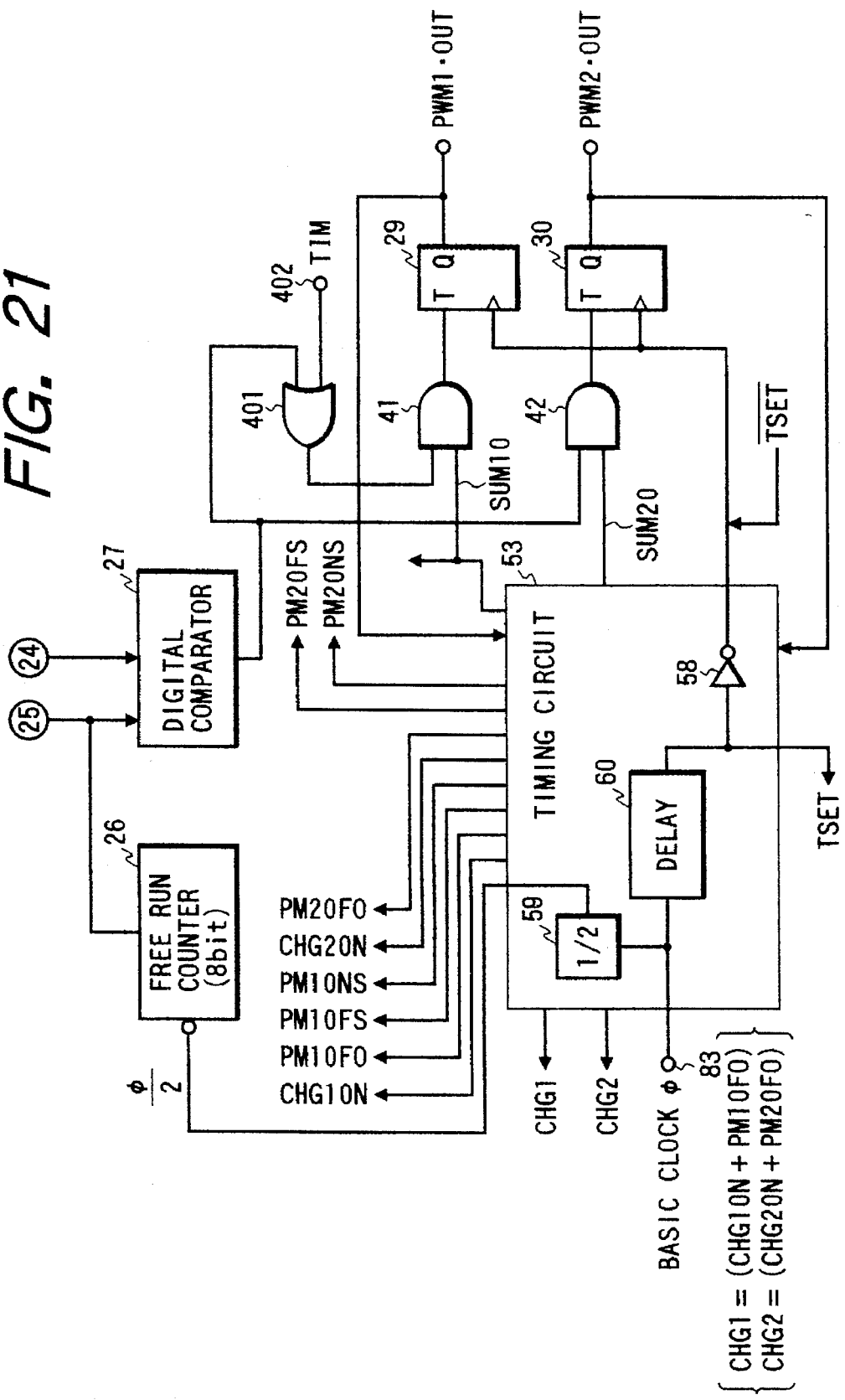
FIG. 21 is a block diagram of the PWM signal generator of the second related art.
Figure 22:
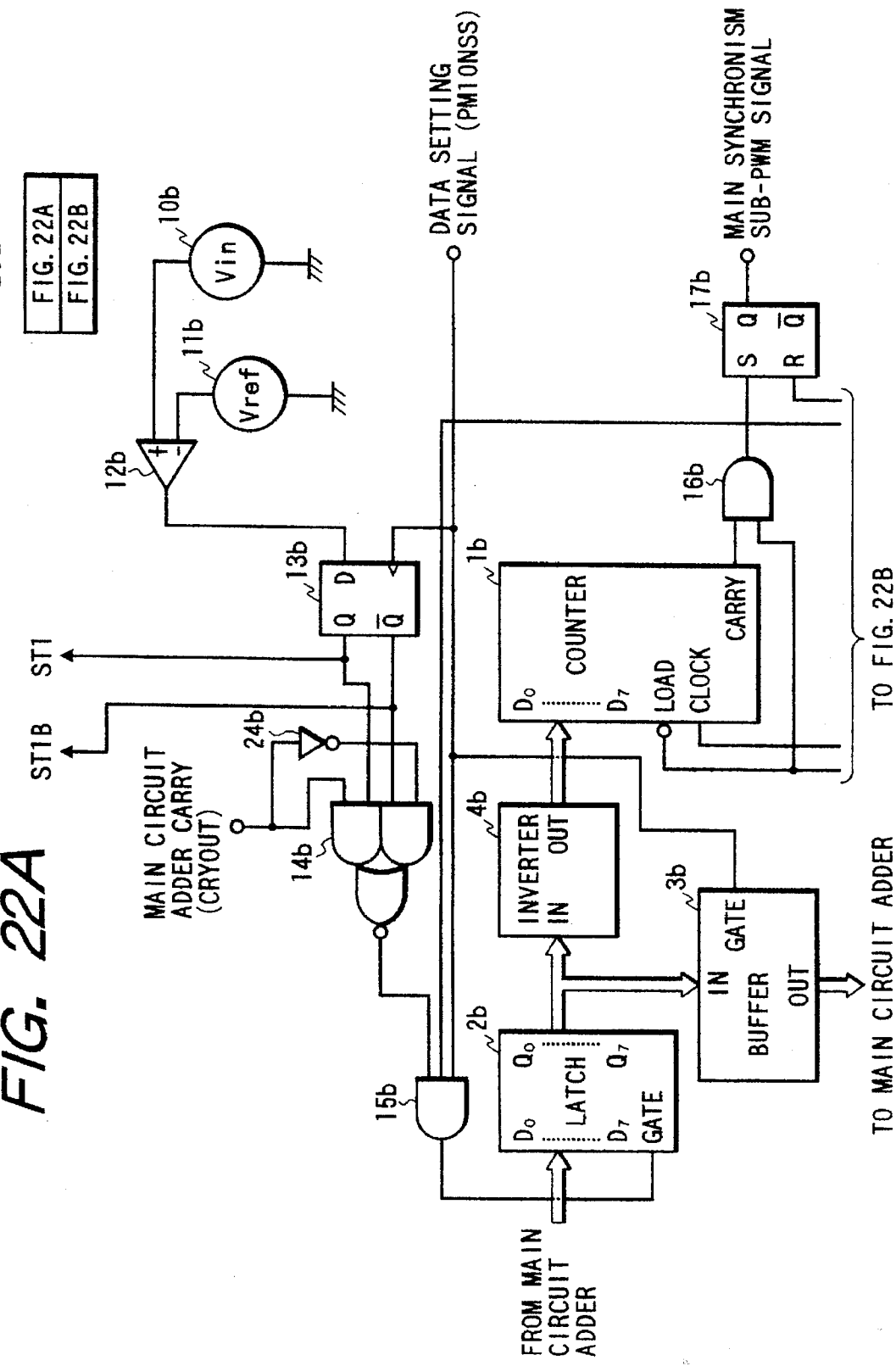
FIG. 22 is comprised of FIGS. 22A and 22B showing block diagrams of a main synchronism sub PWM output unit according to the third related art.
Figure 22B:
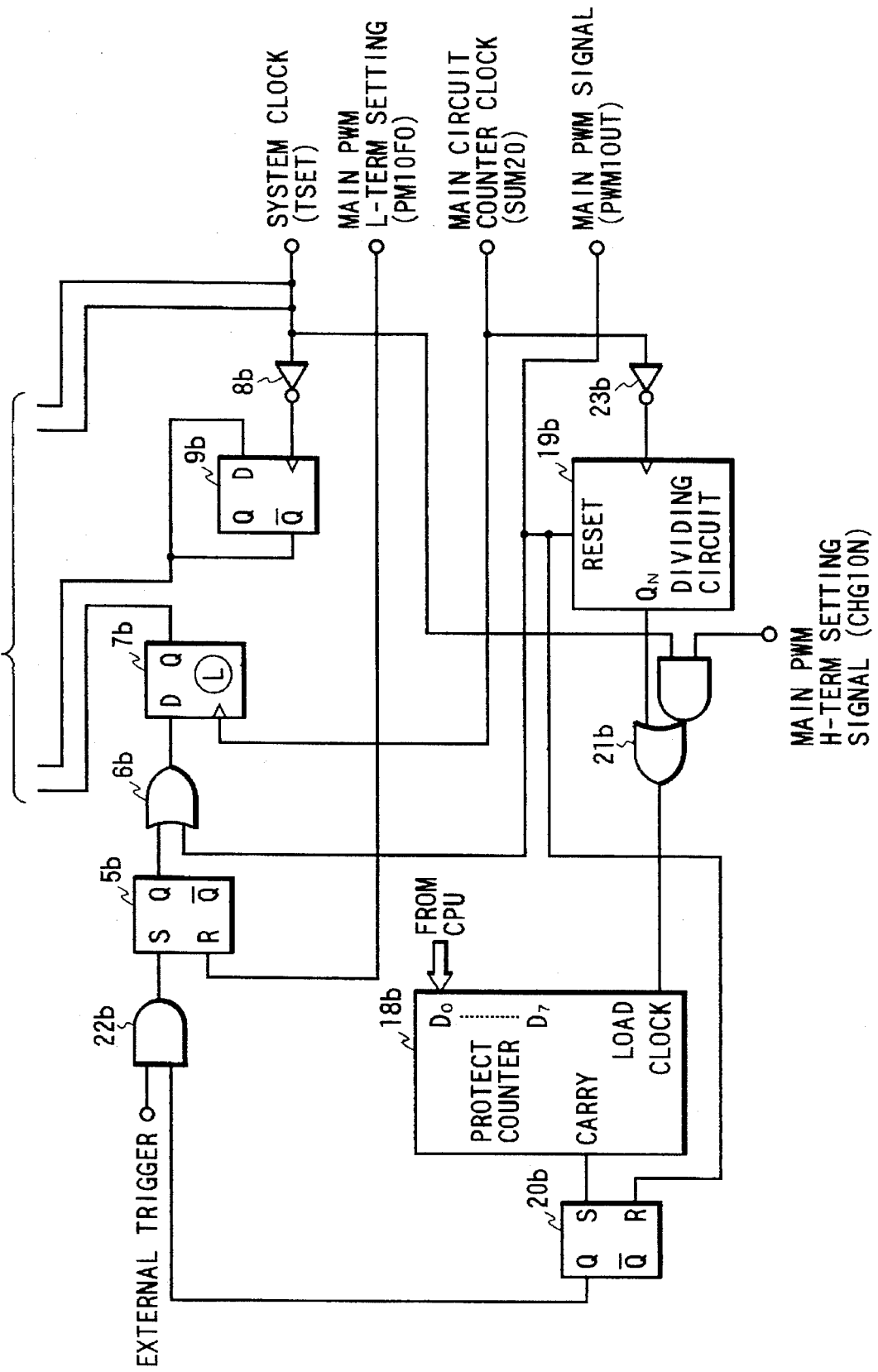
Figures 24, 24A:
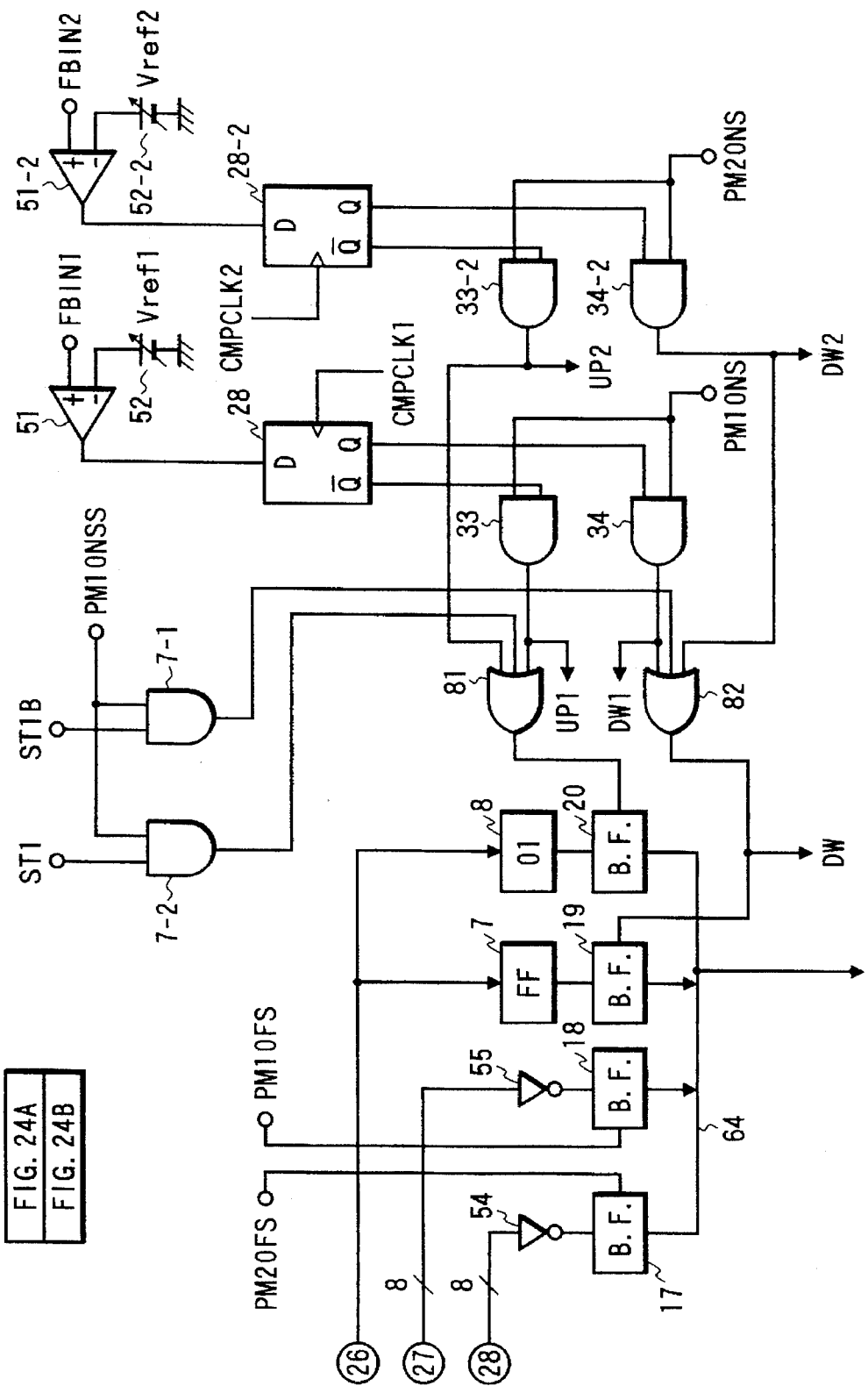
FIG. 24 is comprised of FIGS. 24A and 24B showing block diagrams of the PWM signal generator of the third related art.
Figure 24B:
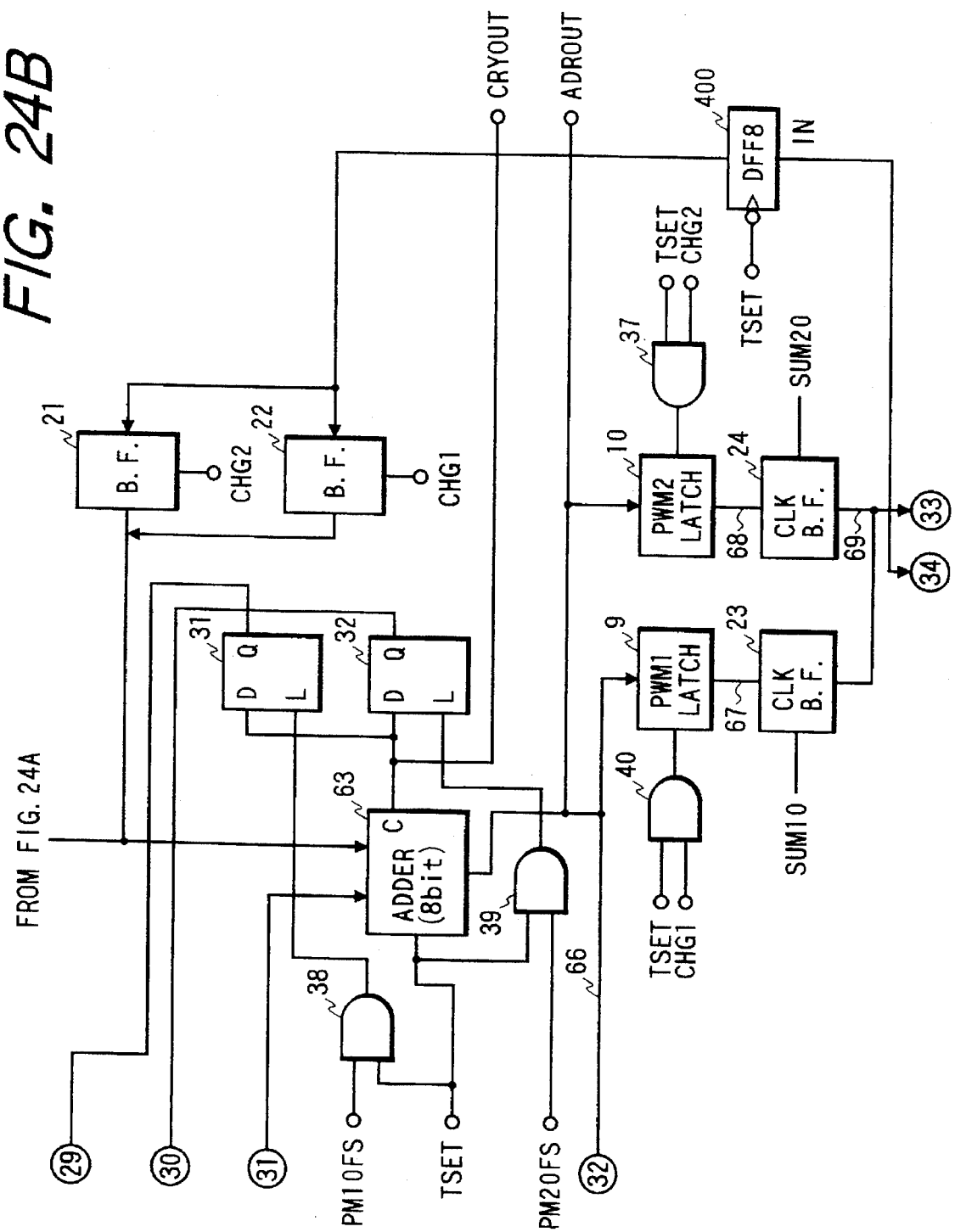
Figure 25:
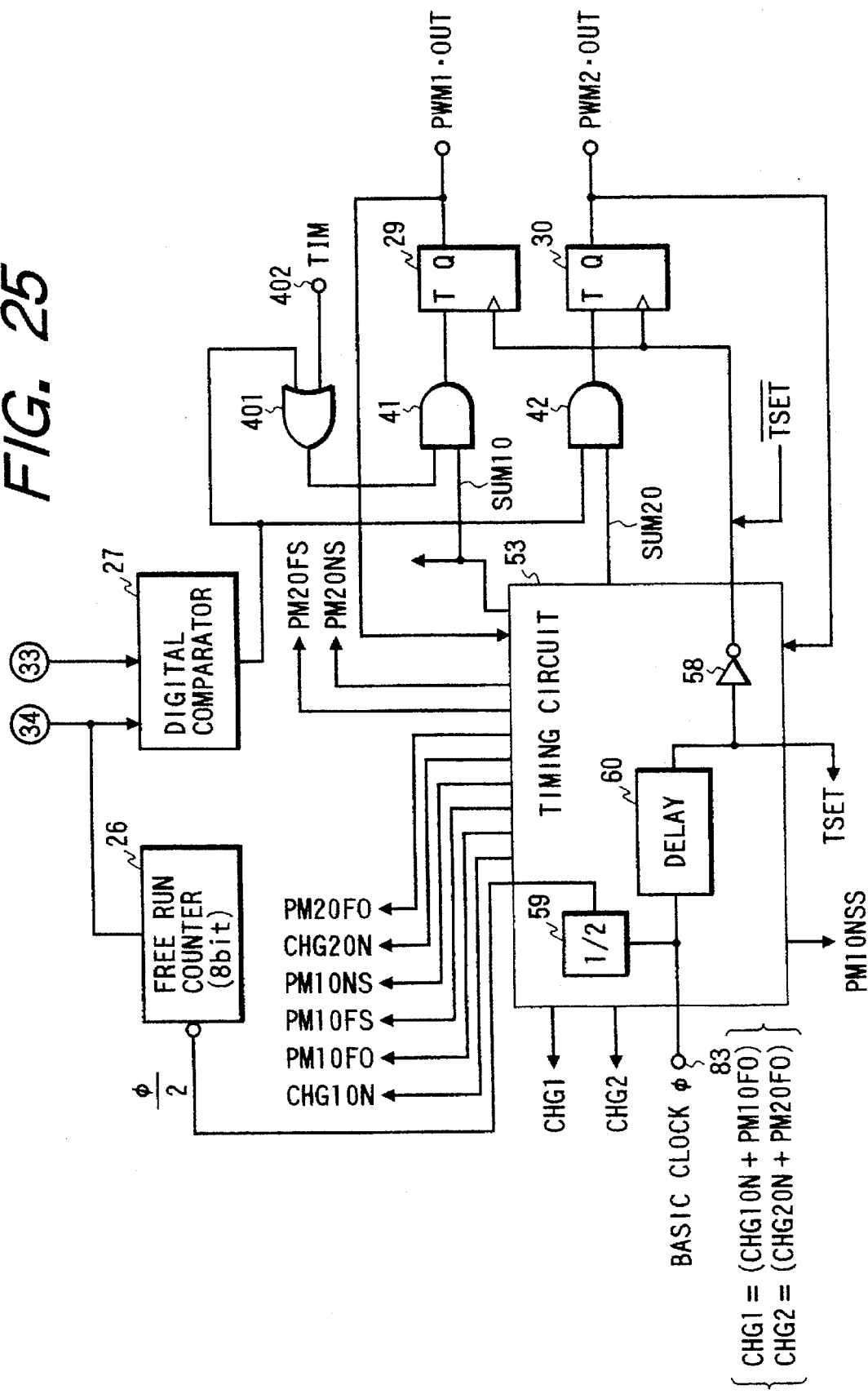
FIG. 25 is a block diagram of the PWM signal generator of the second related art.

With the above control, as shown in FIG. 12, the fall timing of the external trigger signal is delayed by Tγ after the fall timing of the PWM1 signal. In order to avoid a malfunction of the comparator during this delay period, an external trigger inhibition time Tβ of the trigger control circuit 803 is set to meet Tα>Tβ>Tγ. In this manner, a desired operation is ensured.

By properly setting the reference voltage Vth, it is possible to set the comparison result between the voltage V3 synchronous with the gate signal of FET Q1 and the reference voltage Vth, to H level immediately before the PWM1 signal rises, and to start the counter operation for substantially controlling the PWM2 signal. It is therefore possible not to increase the PWM2 signal during the period A and is possible to compensate for the delay time in MOSFET Q2 and transistor Q3 as much as possible. Accordingly, the degree of freedom of design can be made large and the cost of the switching power supply can be reduced.

The invention is not limited only to the above embodiments, but various modifications are possible without departing from the scope of the appended claims.

What is claimed is:

1. A signal generating apparatus for generating a first pulse width modulation signal increasing or decreasing an on-width thereof in a predetermined unit and a second pulse width modulation signal synchronous with the first pulse width modulation signal, the first and second pulse width modulation signals controlling a switching power supply, said signal generating apparatus comprising:

first increasing/decreasing means for increasing or decreasing the on-width of said first pulse width modulation signal;

storage means for storing data representative of the on-width of said second pulse width modulation signal; and second increasing/decreasing means for increasing or decreasing the on-width of said second pulse width modulation signal, by correcting the data stored in said storage means, wherein said second on-width increasing/decreasing means adjusts a correction amount of the data stored in said storage means in accordance with an increasing/decreasing state of said first increasing/decreasing means.

2. An apparatus according to claim 1, wherein said second increasing/decreasing means adjusts data to be added to the data stored in said storage means.

3. A signal generating apparatus comprising:

first generating means for generating a first pulse width modulation signal for controlling a switching power supply;

second generating means for generating a second pulse width modulation signal in synchronism with a leading edge of said first pulse width modulation signal;

first changing means for increasing or decreasing the on-width of said first pulse width modulation signal by changing a timing of the leading edge of said first pulse width modulation signal; and second changing means for increasing or decreasing the on-width of said second pulse width modulation signal;

wherein said second changing means adjusts an increasing/decreasing amount of said second pulse width modulation signal in accordance with an increasing/decreasing state of said first pulse width modulation signal performed by said first changing means.

4. An apparatus according to claim 3, further comprising input means for externally inputting a trigger signal for determining a leading edge of said second pulse width modulation signal, separately from the timing of the leading edge of said first pulse width modulation signal.

5. An apparatus according to claim 4, further comprising protect means for invalidating an input of said trigger signal by said input means for a predetermined period.

6. A switching power supply apparatus comprising:

a transformer having first and second secondary windings;

first generating means for generating a first pulse width modulation signal for controlling the primary side of said transformer in accordance with an output of said first secondary winding, said first generating means being adapted to increase or decrease the on-width of said first pulse width modulation signal, and second generating means for generating a second pulse width modulation signal whose on-width is adapted to increase or decrease, said second pulse width modulation signal adjusting an output of said second secondary winding, said second generating means including storage means for storing data for determining the on-width of said second pulse width modulation signal and correction means for correcting the data stored in said storage means in accordance with an increasing/decreasing state of said first pulse width modulation signal.

7. An apparatus according to claim 6, wherein said second generating means generates said second pulse width modulation signal in synchronism with the leading edge of said first pulse width modulation signal generated by said first generating means.

* * * * *

UNITED STATES PATENT AND TRADEMARK OFFICE
CERTIFICATE OF CORRECTION

PATENT NO. : 5,640,316
DATED : June 17, 997
INVENTOR(S) : Moriya

It is certified that error appears in the above-identified patent and that said Letters Patent is hereby corrected as shown below:

COLUMN 3:

Line 24, "$\overline{Q}$" should read --Q--; and
Line 51, "26" should read --26,--.

COLUMN 5:

Line 17, "Vref" should read --Vref1--.

COLUMN 7:

Line 27, "$\overline{TSET}$" should read --TSET--.

COLUMN 9:

Line 22, "(PM1∅F0)" should read --(PM10F0)--.

UNITED STATES PATENT AND TRADEMARK OFFICE
CERTIFICATE OF CORRECTION

PATENT NO. : 5,640,316

DATED : June 17, 1997

INVENTOR(S) : Moriya

It is certified that error appears in the above-identified patent and that said Letters Patent is hereby corrected as shown below:

COLUMN 10:

Line 33, "1bis" should read --1b is--;
       Line 41, "1bis" should read --1b is--; and
       Line 42 "$\underline{Q}$" should read --$\bar{Q}$--.

COLUMN 11:

Line 1, "lob" should read --10b--; and
       Line 57, "Q" should read --$\bar{Q}$--.

COLUMN 15:

Line 25, "$\overline{TSET}$," should read --$\overline{TSET}$,--; and
       Line 38, "TSET" should read --$\overline{TSET}$--.

UNITED STATES PATENT AND TRADEMARK OFFICE
CERTIFICATE OF CORRECTION

PATENT NO.   : 5,640,316
DATED        : June 17, 1997
INVENTOR(S)  : Moriya

It is certified that error appears in the above-identified patent and that said Letters Patent is hereby corrected as shown below:

COLUMN 16:

Line 42, "1" down" should read --"1"- down--.

COLUMN 20:

Line 10, "RS" should read --R5--.

Signed and Sealed this

Twenty-eighth Day of April, 1998

Attest:

BRUCE LEHMAN

Attesting Officer

Commissioner of Patents and Trademarks